US009341887B2

(12) United States Patent
Whitehead et al.

(10) Patent No.: US 9,341,887 B2
(45) Date of Patent: May 17, 2016

(54) DISPLAYS WITH A BACKLIGHT INCORPORATING REFLECTING LAYER

(75) Inventors: Lorne A. Whitehead, Vancouver (CA); Henry H. Ip, Richmond (CA); Vincent Kwong, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 496 days.

(21) Appl. No.: 13/395,640

(22) PCT Filed: Sep. 8, 2010

(86) PCT No.: PCT/US2010/048180
§ 371 (c)(1),
(2), (4) Date: Mar. 12, 2012

(87) PCT Pub. No.: WO2011/031802
PCT Pub. Date: Mar. 17, 2011

(65) Prior Publication Data
US 2012/0169791 A1 Jul. 5, 2012

Related U.S. Application Data

(60) Provisional application No. 61/241,681, filed on Sep. 11, 2009, provisional application No. 61/287,117, filed on Dec. 16, 2009.

(51) Int. Cl.
*F21V 7/04* (2006.01)
*G02F 1/1335* (2006.01)
(52) U.S. Cl.
CPC .... *G02F 1/133603* (2013.01); *G02F 1/133606* (2013.01); *G02F 1/133605* (2013.01); *G02F 1/133611* (2013.01); *G02F 2001/133601* (2013.01)

(58) Field of Classification Search
CPC .................. G02F 1/133606; G02F 1/133603
See application file for complete search history.

(56) References Cited

U.S. PATENT DOCUMENTS

| 5,600,462 | A | 2/1997 | Suzuki |
| 5,639,158 | A | 6/1997 | Sato |
| 5,825,542 | A | 10/1998 | Cobb, Jr. |

(Continued)

FOREIGN PATENT DOCUMENTS

| EP | 0684423 | 11/1995 |
| EP | 1486818 | 12/2004 |

(Continued)

OTHER PUBLICATIONS

3M Optical Systems Vikuiti™ Brightness Enhancement Film II (BEF II); Copyright 2010 but available at the time of invention.*

(Continued)

*Primary Examiner* — Evan Dzierzynski
*Assistant Examiner* — Zachary J Snyder

(57) ABSTRACT

Displays comprise light control layers (16) in an optical path between a light source (12), such as an array of light emitting diodes and a spatial light modulator (14) such as a liquid crystal display panel. The light control layer comprises an enhanced specular reflector (ESR, 16a) film in optical contact to at least one layer of a transparent or translucent material (16B, 16C). The light control layer transmits light from the light source more readily than the ESR film standing on its own. In some embodiments the display may provide enhanced contrast and peak luminance.

8 Claims, 24 Drawing Sheets

(56) References Cited

U.S. PATENT DOCUMENTS

| | | | |
|---|---|---|---|
| 6,043,591 | A | 3/2000 | Gleckman |
| 6,215,920 | B1 | 4/2001 | Whitehead |
| 6,262,842 | B1 | 7/2001 | Ouderkirk |
| 6,404,131 | B1 | 6/2002 | Kawano |
| 6,490,104 | B1 | 12/2002 | Gleckman |
| 6,663,262 | B2 | 12/2003 | Boyd |
| 6,785,049 | B1 | 8/2004 | Boyd |
| 6,846,089 | B2 | 1/2005 | Stevenson |
| 6,891,672 | B2 | 5/2005 | Whitehead |
| 6,905,220 | B2 | 6/2005 | Wortman |
| 6,924,014 | B2 | 8/2005 | Ouderkirk |
| 7,091,661 | B2 | 8/2006 | Ouderkirk |
| 7,220,026 | B2 | 5/2007 | Ko |
| 7,293,899 | B2 | 11/2007 | Boyd |
| 7,320,531 | B2 | 1/2008 | West |
| 7,400,439 | B2 | 7/2008 | Holman |
| 7,403,332 | B2 | 7/2008 | Whitehead |
| 7,481,563 | B2 | 1/2009 | David |
| 7,534,025 | B2 | 5/2009 | Harbers |
| 7,733,568 | B2 | 6/2010 | Silverstein |
| 2002/0097578 | A1 | 7/2002 | Greiner |
| 2003/0002153 | A1 | 1/2003 | Hiraishi |
| 2004/0233665 | A1* | 11/2004 | West et al. ............ 362/245 |
| 2005/0195340 | A1 | 9/2005 | Lazarev |
| 2005/0280756 | A1 | 12/2005 | Kim |
| 2006/0146539 | A1 | 7/2006 | Weng |
| 2006/0152931 | A1 | 7/2006 | Holman |
| 2006/0290844 | A1* | 12/2006 | Epstein et al. ............ 349/113 |
| 2007/0047228 | A1 | 3/2007 | Thompson |
| 2007/0047261 | A1 | 3/2007 | Thompson |
| 2007/0159843 | A1 | 7/2007 | Choi |
| 2008/0019114 | A1 | 1/2008 | Stuyven |
| 2008/0074862 | A1 | 3/2008 | Chang |
| 2008/0180466 | A1 | 7/2008 | Whitehead |
| 2008/0193731 | A1 | 8/2008 | Laney |
| 2008/0306719 | A1 | 12/2008 | Freier |
| 2009/0160746 | A1 | 6/2009 | Gorog |
| 2009/0167981 | A1 | 7/2009 | Arai |

FOREIGN PATENT DOCUMENTS

| | | |
|---|---|---|
| EP | 1881364 | 1/2008 |
| EP | 2108884 | 10/2009 |
| WO | 02/069030 | 9/2002 |
| WO | 03/077013 | 9/2003 |
| WO | 2005/107237 | 11/2005 |
| WO | 2006/010244 | 2/2006 |
| WO | 2006/066380 | 6/2006 |
| WO | 2008083018 | 7/2008 |
| WO | 2008/092276 | 8/2008 |
| WO | 2009100307 | 8/2009 |
| WO | 2010/045039 | 4/2010 |
| WO | 2010059614 | 5/2010 |

OTHER PUBLICATIONS

Anderson, J., et al., "New Back Reflector and Front Film for Improved Efficiency of Direct-Lit LED Backlights for LCD TV" 2007, Digest of Technical Papers SID International Symposium, v 38, n. 2, pp. 1236-1239.

Guselnikov, N., et al., "Translucent LCDs" Journal of the Society for Information Display, v. 13, No. 4, pp. 339-348, Apr. 2005.

Mossman, M., et al., "Controlled Frustration of TIR by Electrophoresis of Pigment Particles", Appl. Opt. 44(9), Mar. 2005.

Mossman, M., et al., "A Novel Reflective Image Display Using Total Internal Reflection", J. Displays25(5), Nov. 2004.

Webster, M., et al., "Control of Reflection at an Optical Interface in the Absence of Total Internal Reflection for a Retroreflective Display Application" App. Opt. 45(6), Feb. 2006.

\* cited by examiner

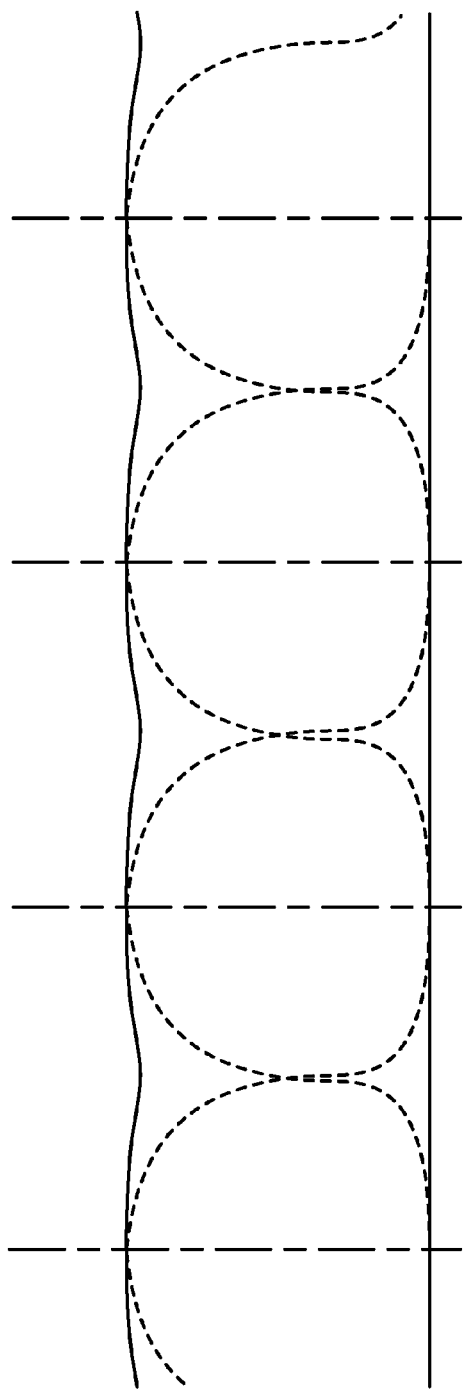
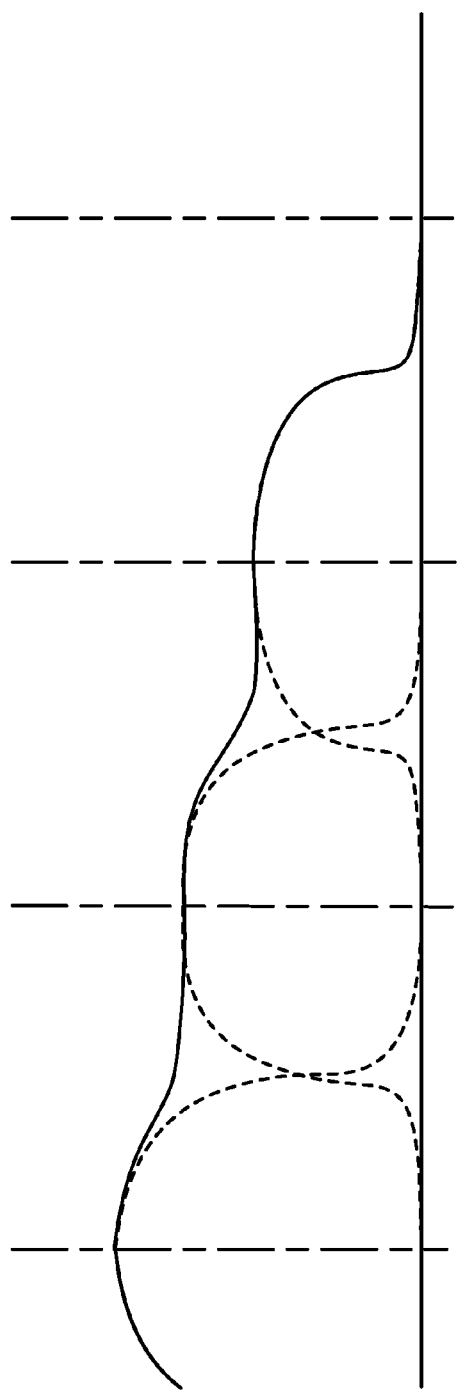
Figure 8A
Figure 8B

DISPLAYS WITH A BACKLIGHT INCORPORATING REFLECTING LAYER

REFERENCE TO RELATED APPLICATIONS

This application claims Paris Convention priority from U.S. Patent Applications No. 61/241,681 filed 11 Sep. 2009, and No. 61/287,117 filed 16 Dec. 2009. For the purposes of the United States of America, this application claims the benefit under 35 U.S.C. §119 of U.S. Patent Applications No. 61/241,681 filed 11 Sep. 2009, and No. 61/287,117 filed 16 Dec. 2009, both of which are hereby incorporated by reference.

TECHNICAL FIELD

The invention relates to backlit displays. Embodiments may provide displays such as televisions, computer displays, special purpose displays such as medical imaging displays or virtual reality displays, video game displays, advertising displays, and the like.

BACKGROUND

A wide variety of electronic displays are presently in use in a multitude of different applications, including televisions, computer displays, special purpose displays such as medical imaging displays or virtual reality displays, video game displays, advertising displays, and the like. Some electronic displays include a backlit light modulator. The light modulator is controllable to adjust the light passing through its pixels to display an image. In some such displays the backlight is controllable to cause a non-uniform distribution of light on the light modulator.

There exists a need for practical improved displays, and methods and apparatus for illuminating light modulators in displays capable of displaying high quality images. There is a particular need for practical displays capable of displaying images with enhanced contrast and peak luminance.

SUMMARY OF THE INVENTION

The invention has a wide range of different aspects, some of which are as follows.

One aspect provides a display comprising a light source, a spatial light modulator, and a light control layer in an optical path between the light source and the spatial light modulator. The light control layer comprises an enhanced specular reflector layer and at least a first optical layer in optical contact with a first side of the enhanced specular reflector layer. The first optical layer is at least one of substantially transparent and substantially translucent. In some embodiments: the light control layer is coextensive with the spatial light modulator, the light source comprises a plurality of individually-controllable light emitters arranged in an array, the display comprises a back reflector spaced apart from and parallel to the light control layer, and/or the first optical layer comprises a rear layer located between the enhanced specular reflector layer and the back reflector, an optical cavity is defined between the back reflector and the enhanced specular reflector layer, and the rear layer occupies at least ¾ of a thickness of the optical cavity.

Another aspect provides a backlight assembly comprising a light control layer and a light source configured to emit light toward the light control layer. The light control layer comprises an enhanced specular reflector layer and a first optical layer in optical contact with a first side of the enhanced specular reflector layer. The first optical layer is substantially transparent and/or substantially translucent. In some embodiments: the light control layer is coextensive with the spatial light modulator, the light source comprises a plurality of individually-controllable light emitters arranged in an array, and/or the first optical layer comprises a rear layer located between the enhanced specular reflector layer and the back reflector, an optical cavity is defined between the back reflector and the enhanced specular reflector layer, and the rear layer occupies at least ¾ of a thickness of the optical cavity.

Another aspect provides a light control layer comprising an enhanced specular reflector layer and a first optical layer in optical contact with a first side of the enhanced specular reflector layer. The first optical layer is substantially transparent and/or substantially translucent. In some embodiments: the light control layer is coextensive with the spatial light modulator, the light source comprises a plurality of individually-controllable light emitters arranged in an array, the display comprises a back reflector spaced apart from and parallel to the light control layer; the backlight assembly comprises a back reflector spaced apart from and parallel to the light control layer, and/or the first optical layer comprises a rear layer located between the enhanced specular reflector layer and the back reflector, an optical cavity is defined between the back reflector and the enhanced specular reflector layer, and the rear layer occupies at least ¾ of a thickness of the optical cavity.

Another aspect provides a light emitter comprising a light emitting region and a package, the package comprising a back reflector and a light control layer mounted on the back reflector and enclosing the light emitting region therebetween. In some embodiments according to this aspect the light control layer comprises an enhanced specular reflector layer and a first optical layer in optical contact with a first side of the enhanced specular reflector layer. The first optical layer is substantially transparent and/or substantially translucent. In some such embodiments, the first side of the enhanced specular reflector layer faces the light emitting region. In other such embodiments, the first side of the enhanced specular reflector layer faces away from the light emitting region.

Another aspect provides a control system for a display comprising a light source configured to emit light through a light control layer onto a light modulator. The control system comprises a light source controller configured to generate control signals for controlling the light source, a light field simulator configured to generate a light field simulation of the light field produced at the light modulator by light emitted from the light source that passes through the light control layer, and a light modulator controller configured to generate light modulator control signals for controlling the light modulator based at least in part on the light field simulation. The light field simulator includes a model that models or estimates the effect of the light control layer, as described herein, on light propagating from the light source.

Another aspect provides a method for controlling a display comprising a light source configured to emit light through a light control layer onto a light modulator. The method comprises generating light source control signals for controlling the light source, generating a light field simulation of the light field produced at the light modulator by light emitted from the light source in response to the light source control signals and passing through the light control layer, and generating light modulator control signals for controlling the light modulator based at least in part on the light field simulation.

Further aspects of the invention and features of specific embodiments of the invention are described below.

BRIEF DESCRIPTION OF THE DRAWINGS

The accompanying drawings illustrate non-limiting example embodiments of the invention.

FIG. 8A is a graph of light intensity as a function of position on a light modulator for a plurality of light emitters.

FIG. 8B is a graph of light intensity as a function of position on a light modulator for a plurality of light emitters.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
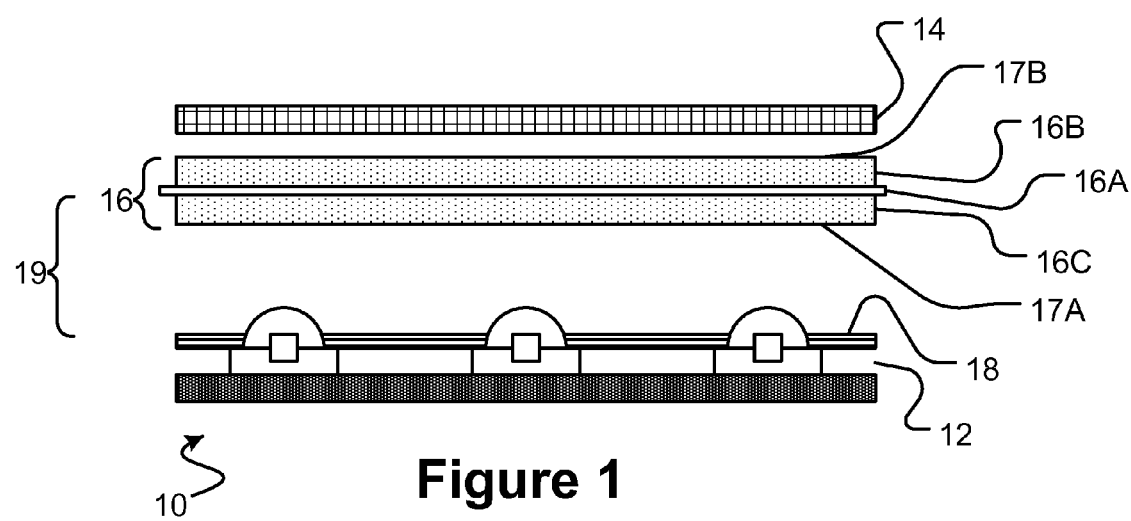
FIG. 1 is a schematic cross-section of a portion of a display according to an example embodiment.

FIG. 1 shows a display 10 according to an example embodiment. Display 10 comprises a light source 12 that is configured to emit light to illuminate a transmission-type light modulator 14. Light modulator 14 may, for example, comprise a liquid crystal display panel (LCD panel). Light modulator 14 may comprise an array of pixels which are controllable to vary the amount of incident light that is transmitted by light modulator 14. In some embodiments the pixels comprise individually controllable color sub-pixels.

A light control layer 16 is located between light source 12 and light modulator 14. Light from light source 12 passes through light control layer 16 to reach light modulator 14. Light control layer has a back side 17A facing toward light source 12 and a front side 17B facing toward light modulator 14.

Light control layer 16 comprises a layer 16A of an enhanced specular reflector (ESR). The ESR layer 16A may comprise a multilayer dielectric film that reflects and transmits light over substantially all visible wavelengths and at a wide range of angles of incidence with low absorption. ESR layer 16A may comprise a highly reflective ESR film that reflects a substantial proportion of visible light. ESR film is commercially available from 3M Electronic Display Lighting Optical Systems Division of St. Paul, Minn., USA under the brand name Vikuiti™. Vikuiti™ Enhanced Specular Reflector film is stated to be 98.5% reflective over the entire visible spectrum, regardless of the angle of incidence.

ESR layer 16A may be thin. For example, one type of Vikuiti™ ESR film suitable for application in an embodiment as shown in FIG. 1 has a thickness of 65 μm.

Light control layer 16 also comprises at least one layer of a transparent or translucent material having an index of refraction that is greater than that of air (e.g. greater than 1) and is in optical contact with ESR layer 16A. In the illustrated embodiment, light control layer comprises both a front layer 16B and a rear layer 16C. Other embodiments have only one of layers 16B and 16C.

Due to the presence of layers 16B and/or 16C, light control layer 16 has a reflectivity significantly lower than ESR layer 16A would have if standing on its own in air. Layers 16B and/or 16C act to reduce the reflectivity of ESR layer 16A. Layers 16B and/or 16C may comprise, for example, suitable plastics such as:
polycarbonates;
Poly(methyl methacrylate) (e.g. Plexiglas™);
acrylics; and
polyurethane;
birefringent polyester;
isotropic polyester; and
syndiotactic polystyrene.

Layers 16B and 16C may be made out of suitable glasses, or other materials that are substantially clear or translucent to wavelengths of light in the visible range.

The thicknesses of layers 16B and 16C may be varied. In some embodiments, layers 16B and 16C have thicknesses in excess of ½ mm (500 µm). For example, in an example embodiment, layers 16B and 16C have thicknesses in the range of 1 mm to 5 mm. In some cases, layers 16B and 16C are significantly thicker than ESR layer 16A. For example, one or both of layers 16B and 16C may have a thickness that is at least 5 times that of a thickness of ESR layer 16A.

As shown in FIG. 1, display 10 comprises a reflector 18 at or behind light source 12. Reflector 18 may, for example, comprise an ESR layer or a diffuse scatterer such as a suitable white ink or white paint. An optical cavity 19 is defined between reflector 18 and layer 16A of light control layer 16. In the illustrated embodiment, light is emitted by light source 12 toward light control layer 16. At light control layer 16, some of the light is reflected and some of the light is transmitted. The transmitted light passes to light modulator 14. Reflected light passes to reflector 18 and is recycled by being reflected back toward light control layer 16.

In some embodiments, light source 12 comprises a plurality of individually-controllable light emitters. The light emitters may be arranged such that the amount of light emitted by light source 12 can be made to vary from location to location across light source 12 by controlling the amounts of light emitted by different ones of the individually-controllable light emitters. Providing a light control layer 16 as described herein can provide special advantages in some embodiments that also have a locally-controllable light source 12.

The reflectivity of light control layer 16 may be controlled by choosing an appropriate material for layers 16B and 16C (or one of these layers if the other is not present). A main parameter that affects the reflectivity of light control layer 16 is the index of refraction of the material of layers 16B and 16C that is in optical contact with ESR layer 16A. The reflectivity of light control layer 16 may be controlled to adjust the point spread function of light from light source 12 that emerges from layer 16. In general, the higher the reflectivity of layer 16, the more layer 16 will broaden the point spread function of light from light source 12. Increased broadening may be desirable, for example, where light source 12 comprises a relatively sparse array of LEDs and where light source 12 comprises LED that output light over a narrow angular aperture. In some embodiments, light control layer 16 reflects in the range of about 65% to 85% of the light incident on it. In some embodiments light control layer 16 reflects approximately 73%±5% of the light incident on it. In some embodiments, light control layer 16 specularly reflects in the range of about 5-20% of the light incident on it.

By way of non-limiting example, a light control layer as described herein may be incorporated between a light source and light modulator in displays having architectures as described in any of:
U.S. Pat. No. 6,891,672 issued 10 May 2005 and entitled High Dynamic Range Display Devices,
U.S. Pat. No. 7,403,332 issued 22 Jul. 2008 and Entitled High Dynamic Range Display Devices,
United States Patent publication No. 2008/0180466 published 31 Jul. 2008 and entitled Rapid Image Rendering on Dual-modulator Displays,
PCT Publication No. WO 2002/069030 published 6 Sep. 2002 and entitled "High Dynamic Range Display Devices";
PCT Publication No. WO 2003/077013 published 18 Sep. 2003 and entitled "High Dynamic Range Display Devices";
PCT Publication No. WO 2005/107237 published 10 Nov. 2005 and entitled "Method for Efficient Computation of Image Frames for Dual Modulation Display Systems Using Key Frames";
PCT Publication No. WO 2006/010244 published 2 Feb. 2006 and entitled "Rapid Image Rendering on Dual-Modulator Displays".
PCT Publication No. WO 2006/066380 published 29 Jun. 2006 and Entitled: Wide Color Gamut Displays; and
PCT Publication No. WO 2008/092276 published 7 Aug. 2008 and entitled: Calibration of Displays Having Spatially-Variable Backlight; all of which are hereby incorporated herein by reference for all purposes.

The construction of light control layer 16 may be varied in a number of ways. These include:
  whether one, or the other, or both of layers 16B and 16C are present;
  the relative thicknesses of layers 16B and 16C (in some embodiments, layer 16B is thicker than layer 16C);
  the materials of which layers 16B and 16C are made (it is not mandatory that layers 16B and 16C, if both present, be made of the same material);
  the indices of refraction of layers 16B and/or 16C (it is not mandatory that layers 16B and 16C, if both present, have the same index of refraction);
  the construction of ESR layer 16A (in some embodiments, ESR layer 16A is constructed to provide a reflectivity of less than 96% in the absence of layers 16B and 16C);
  the number of ESR layers present in light control layer 16;
  the spacing between refraction layer 16B and light modulator 14 may be eliminated or increased to provide control over the spread of light incident on light modulator 14;
  the presence or absence of surface-relief holographic diffuser elements on surfaces of layers 16B and/or 16C; and
  the presence or absence of scattering centers in layers 16B and/or 16C and, in embodiments where such scattering centers are present, the nature of the scattering centers and their distribution in three dimensions within the layer 16B and/or 16C.

Scattering centers in layers 16B and/or 16C may comprise, for example, one or more of:
  particles of any suitable pigment, the pigment may comprise $TiO_2$, for example;
  refractive light scatterers such as small glass beads or other refractive light scatterers (in some embodiments the refractive light scatterers comprise, for example, a high refractive index glass and/or a material having an index of refraction of at least 1.6 or at least 1.7);
  dislocations, bubbles or other discontinuities of the material of layers 16B and 16C; and
  the like.

Scattering centers may range in size from, for example, nanometers to 100 micrometers. In some embodiments the scattering centers are Lambertian or nearly so. In alternative embodiments the scattering centers may be anisotropic scatterers. In some embodiments the anisotropic scatterers are oriented such that they scatter light traveling in certain preferred directions more than light traveling in other directions and/or tend to scatter light more in some directions than in others. For example, in some embodiments, anisotropic scatterers are oriented such that they tend to scatter light more in the direction of modulator 14 than in the direction of reflector 18 or directions generally parallel to the plane of layer 16.

Figure 1A:
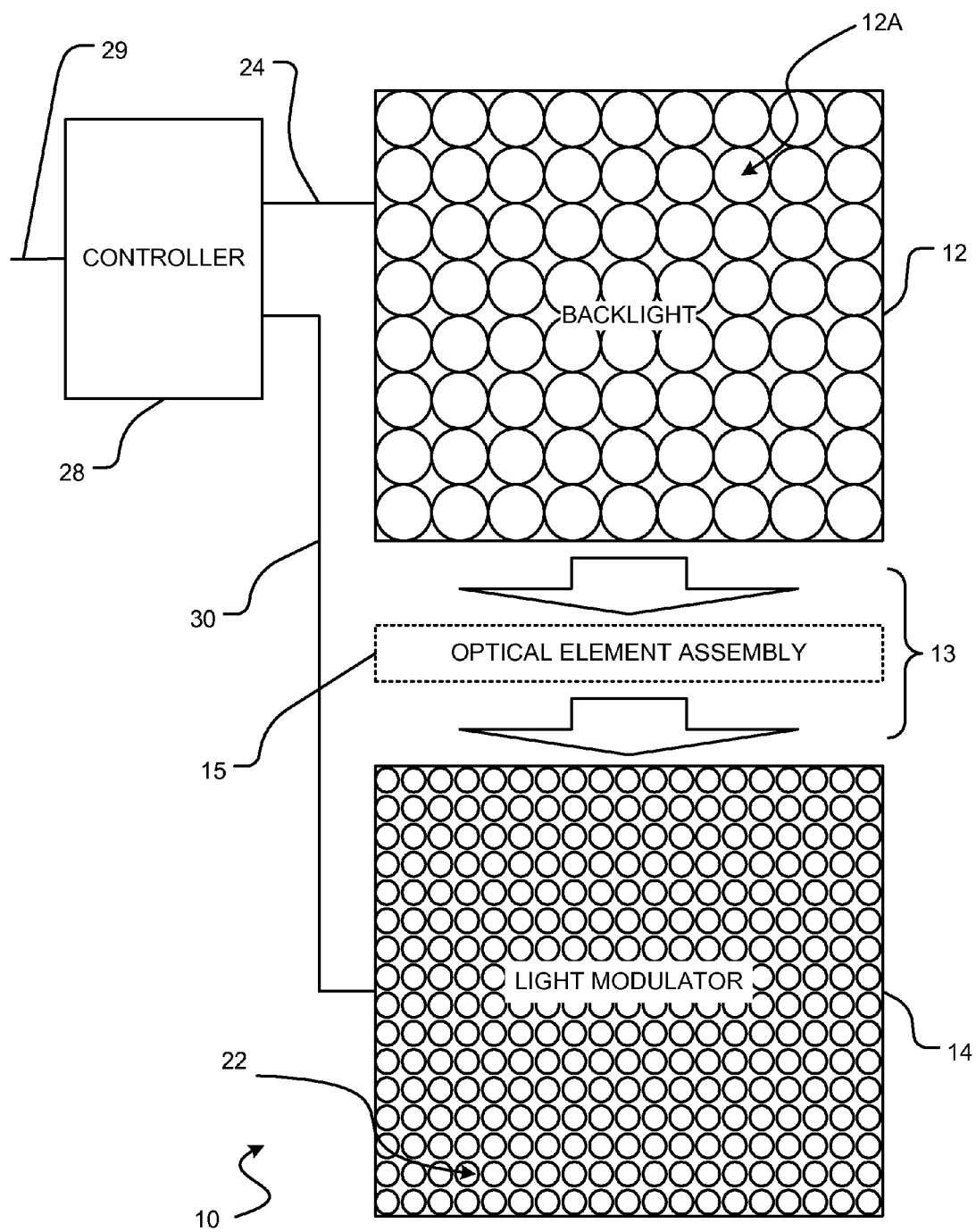
FIG. 1A is a schematic view of a display according to an example embodiment.

FIG. 1A is a schematic depiction of a display 10 according to an example embodiment. Display 10 has a light source 12 (e.g. backlight) that is operable to emit light. Light from light source 12 is delivered to a spatial light modulator 14 through an optical path 13. In some embodiments, optical path 16 comprises an optical element assembly 15. Spatial light modulator 14 comprises light modulating elements (LMEs) 22 that modulate light from light source 12. In a simple embodiment, light source 12 and spatial light modulator 14 are parallel and juxtaposed such that light emitted by light source 12 passes directly through optical path 16 onto spatial light modulator 14.

Display 10 comprises a controller 28. Controller 28 receives input signals 29. Input signals 29 may comprise image data, video data, or the like. Controller 28 generates output signals 30 that supply driving values for LMEs 22 of spatial light modulator 14. LME driving values determine what proportion of the light incident on LMEs 22 from light source 12 is passed on (transmitted or reflected) to a viewing area. Controller 28 also generates output signals 24 that supply driving values for light emitters 12A of light source 12.

In embodiments comprising individually-controllable light emitters 12A, output signals 24 may comprise driving signals that can directly or indirectly drive light emitters 12A to emit light. Output signals 24 may control one or more of: the overall intensity of light emitted by light source 12, the spatial distribution of light emitted by light source 12, one or more color characteristics of light emitted by light source 12 or the like.

In the illustrated example embodiment, light source 12 comprises an array of light emitters 12A. Each of light emitters 12A may comprise one or more light-emitting elements such as light-emitting diodes (LEDs) or other light-emitting devices.

In some embodiments, output signals 30 may be generated based in part on characteristics of light from light source 12 at spatial light modulator 14. Such characteristics may be spatially-dependent. Characteristics of light from light source 12 on spatial light modulator 14 may be determined by calculation, estimation, measurement, a combination thereof, or the like. Determination of characteristics of light from light source 12 on spatial light modulator 14 may comprise comprising contributions to the light from individual light emitters 12A. The contribution to the light incident at a particular point on spatial light modulator 14 from a light emitter 12A may be determined based upon factors including known characteristics of the light emitter 12A and the optical path from light emitter 12A to spatial light modulator 14 as well as the spatial relationship of the point on the spatial light modulator 14 and the light emitter 12A. As one skilled in the art can appreciate, calculation of characteristics of light that are contributed to by light from multiple light emitters may be computationally expensive.

Some non-limiting examples of general approaches that may be implemented in controller 28 for generating output signals 30 and 24 are described in:
WO02/069030 entitled HIGH DYNAMIC RANGE DISPLAY DEVICES;
WO03/077013 entitled HIGH DYNAMIC RANGE DISPLAY DEVICES;
WO 2006/010244 entitled RAPID IMAGE RENDERING ON DUAL-MODULATOR DISPLAYS;
U.S. 61/105,419 filed on 14 Oct. 2008 and entitled: light source SIMULATION AT REDUCED RESOLUTION TO DETERMINE SPATIAL MODULATIONS OF LIGHT FOR HIGH DYNAMIC RANGES IMAGES;
which are hereby incorporated herein by reference.

Light emitters 12A emit light in a manner such that the intensity of emitted light at planes perpendicular to the optical axis of the light emitter is distributed according to a spread function. Where light source 12 comprises such light emitters, the degree of spatial-uniformity of light achievable at light modulator 14 depends on the arrangement of light emitters 12A, the spread functions of light emitters 12A, and the distance between light source 12 and light modulator 14. For some light emitters 12A the spread function is characterized by monotonically decreasing intensity in directions away from the optical axis. The spread functions of light emitters 12A may be affected by the optical characteristics of optical path 13, including optical element assembly 15, if present.

Display 10 may be called on to show visual images that comprise large, bright, uniform features (e.g., a blue-sky). Because the ability of light modulator 14 to modulate the intensity of light from light source 12 may be limited, in cases where light from light source 12 is insufficiently spatially-uniform, visible artefacts may appear in what should be uniform image features (e.g., bright spots within the blue-sky). Though the intensity of spatially non-uniform light may be lowered to enable light modulator 14 to provide uniform image features without visible artefacts, this approach reduces the brightness of the image displayed. It is accordingly desirable that light source 12 be able to provide spatially-uniform high intensity light. To provide illumination that is more spatially-uniform, light emitters 12A are typically arranged so that the light from different light emitters 12A can overlap spatially at spatial modulator 14.

In some embodiments, light emitters 12A are individually controlled. Separately controlling light emitters enables spatial variation of the intensity of light incident on light modulator 14. Advantageously, spatially varying the intensity of light provided to a light modulator may be used to enhance contrast and provide a greater dynamic range of brightness between light and dark areas of an image (e.g., between a bright sky and a dark mountain). In order to provide sharper contrast, it is desirable that light from individual light emitters not provide light that is spread over too large an area of light modulator 14. For example, it is desirable that only a small proportion of the light emitters that provide light to the area of a light modulator 14 that displays a bright sky also provide light to the area of a light modulator 14 that displays a dark mountain.

Providing a desired degree of overlap of spread functions of light emitters 12A at spatial light modulator 14 may be achieved by spacing light source 12 apart from spatial light modulator 14 to provide an optical cavity between light source 12 and spatial light modulator 14. The distribution of light from any one light emitter 12A on spatial light modulator 14 then depends on a number of factors including:
  the intrinsic spread function for the light emitters 12A;
  the spacing between the light source 12 and spatial light modulator 14; and
  optical characteristics of light source 12 and spatial light modulator 14 that affect the degree to which light spreads in directions parallel to spatial light modulator 14.

A desired balance between overlap of light from different light emitters 12A, the ability to locally dim areas of an image and optical efficiency can be achieved by adjusting these factors as well as the arrangement of light emitters 12A on light source 12. For some applications, such designs result in a display that is undesirably thick and/or requires an undesirably large number of light emitters 12A.

Optical element assembly 15 may comprise optical elements that affect light from light source 12. For example, optical elements may cause light to change direction by causing light to undergo refraction, reflection, diffraction, a combination of these, or the like. Optical elements may also absorb and/or scatter light. Optical elements in optical element assembly 15 may be provided to spread light from light source 12 so that a desired degree of overlap in the spread functions of light emitters 12A may be achieved at a relatively closer spacing between light source 12 and light modulator 14 than would be possible, absent such optical elements. This advantageously enables display 10 to be thinner.

Where a light source comprises individually-controllable light emitters, optical elements in optical element assembly 15 may shape spread functions to cause illumination from light source 12 to vary more smoothly between differently-controlled light emitters, thereby reducing or eliminating to certain visible artefacts.

Figure 2:
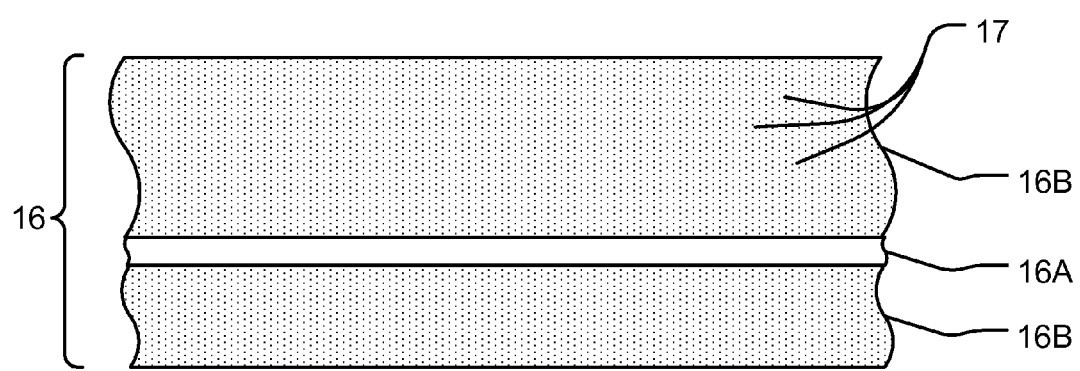
FIG. 2 is a schematic cross-section of a portion of a light control layer according to an example embodiment

FIG. 2 is a schematic expanded cross section of a portion of light control layer 16 according to an example embodiment. In the illustrated embodiment, layers 16B and 16C of light control layer 16 are configured to diffuse light that passes through them. By way of example, layers 16B and/or 16C may comprise scattering centers 17 distributed in their bulk. The presence and type of scattering centers 17 and the way in which the scattering centers 17 are distributed in three dimensions within layers 16B and/or 16C can effect the distribution of light that passes through light control layer 16. In some embodiments, scattering centers 17 are uniformly distributed in one or both of layers 16B and 16C. In some embodiments, scattering centers 17 are distributed non-uniformly in at least one of layers 16B and 16C.

Figure 3:
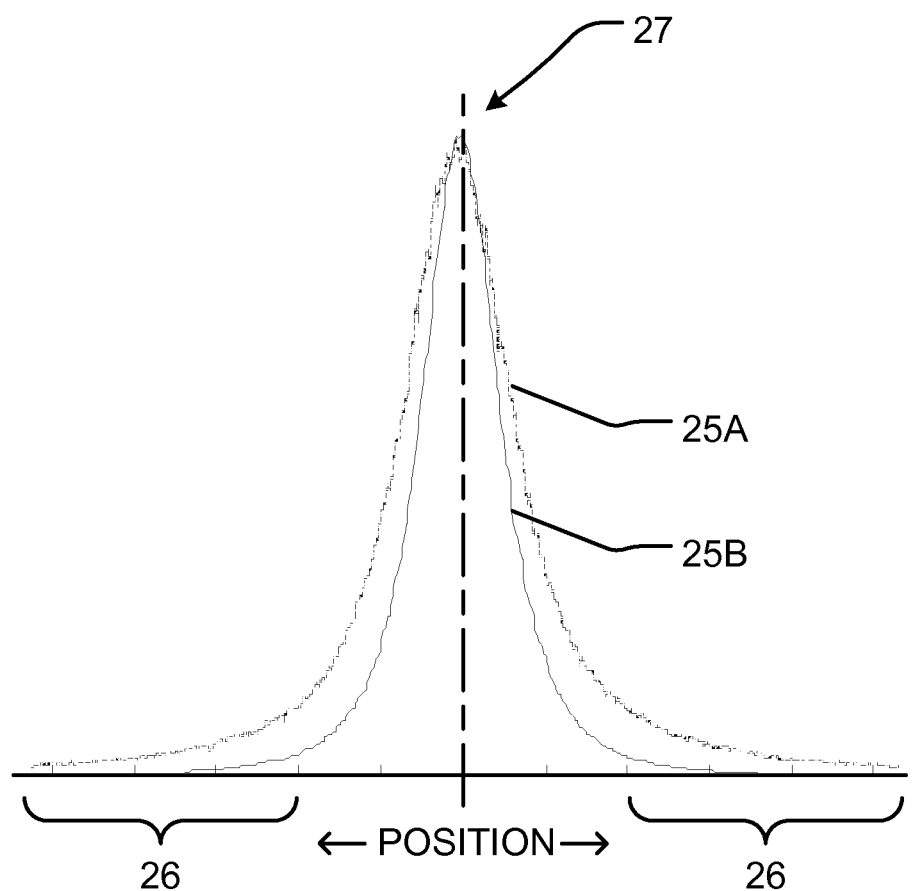
FIG. 3 is a graph showing point spread functions of light from a light emitter.

FIG. 3 is a graph which includes curve 25A which is a point spread function for a light emitter with an air gap in place of light control layer 16 and a curve 25B which is a point spread function for the light emitter with a light control layer 16. Curves 25A and 25B may, for example, represent the distribution of light from one light emitter at a spatial light modulator 14. By comparing curves 25A and 25B it can be seen that the presence of light control layer 16 has significantly reduced the relative amounts of amount of energy in the tails 26 of the point spread function as compared to the amount of energy in a central part of the point spread function.

In FIG. 3, the light control layer 16 in the display for which curve 25B was measured was made up of a layer of 3M Vikuiti™ ESR film sandwiched between two 5 mm thick layers of polyester resin doped with three 0.04 mL drops of Castin' Craft™ white opaque pigment, which is available from Environmental Technology Inc. of Fields Landing, Calif.

In some embodiments, the presence of light control layer 16 increases the ratio of the amount of light energy in a central portion of the point spread function to an amount of light energy in tails of the point spread function by a factor A as follows:

$$A = \frac{(E_{CF}/E_{TF})}{(E_{CW}/E_{TW})} \quad (1)$$

where: $E_{CF}$ is the optical energy in a central part of the point spread function with a light control layer 16 (within one full-width at half maximum of the point spread function); $E_{TF}$ is the optical energy in tails of the point spread function with a light control layer 16 (outside of twice the full width at half-maximum of the point spread function); $E_{CW}$ is the optical energy in a central part of the point spread function without a light control layer 16; and $E_{TW}$ is the optical energy in tails of the point spread function without a light control layer 16. In some embodiments A is in the range of 0.7 to 1.8. Providing modified point spread functions in which the amount of energy in tails 26 is reduced can have a number of benefits including a significant increase in achievable contrast. In addition, in some embodiments reducing the amount of energy in tails 26 facilitates reducing the number of light emitters that need to be taken into account to estimate the intensity of light at a given location on spatial light modulator 14.

In some embodiments, light control layer 16 is constructed to have properties that vary periodically across light control layer 16. Where light source 12 comprises discrete light emitters arranged in a spatially periodic manner the spatial periodicity of light control layer 16 may be matched to the spatial periodicity of the light emitters of light source 12. In some embodiments the variability in one or more properties of light control layer 16 in its parts adjacent to a light emitter are symmetrical with respect to an optical axis of the light emitter. In some embodiments, the spatial variation in the properties of light control layer 16 is configured so that the point spread functions for all or selected groups of the light emitters of light source 12 are modified in the same manner. One property that may be varied to achieve such control over the point spread functions is the density of scattering centers in layers 16B and/or 16C and/or on surfaces of layers 16B and/or 16C. It has been found that regions with higher densities of scattering centers obtain greater transmission of light. Accordingly, the distribution of scattering centers with respect of the optical axis of a light emitter may be used to concentrate or disperse light from the light emitter with respect to its optical axis.

Figure 4A:
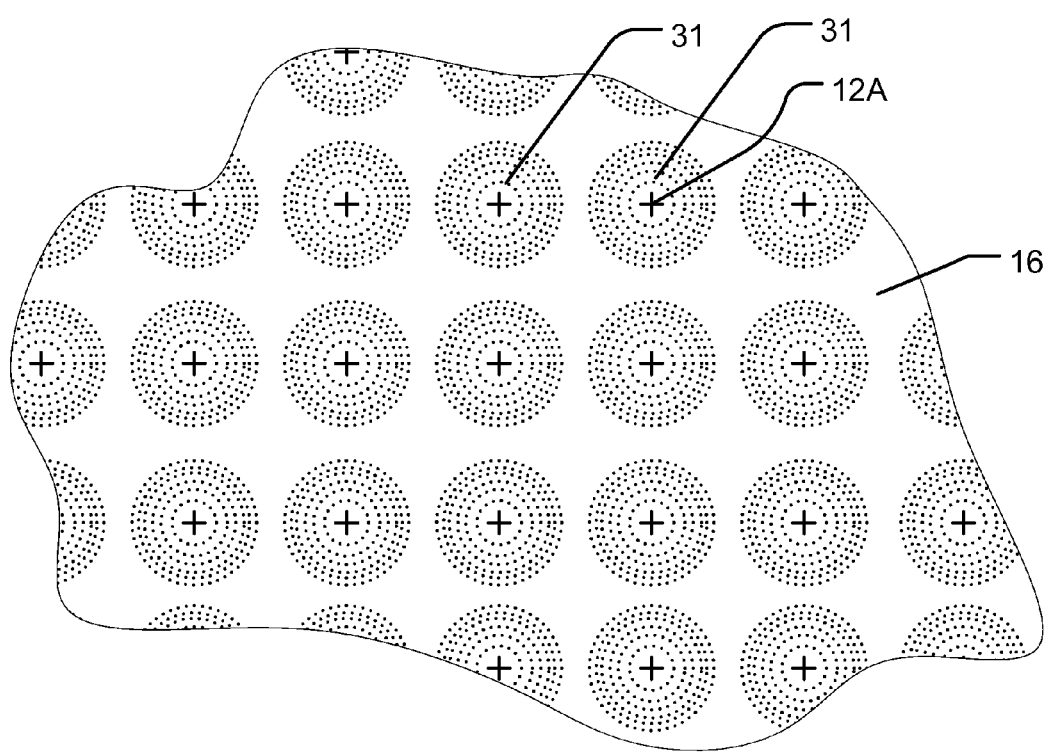
FIG. 4A is schematic plan view of a portion of a light control layer according to an example embodiment deployed over an array of light emitters.

FIG. 4A shows schematically a portion of light control layer 16 deployed over an array of light emitters 12A. Locations of optical axes of the light emitters are marked by + symbols. In this example embodiment the density of scattering centers in layers 16B and/or 16C is relatively low in regions 31 immediately over each light emitter and increases as one moves away from the optical axis of the light emitter. In this example embodiment, the variation in density of the scattering centers is circularly symmetrical in the vicinity of each light emitter 12A. In some embodiments the scattering centers have an increased density in an array of annular regions. In some embodiment, the annular regions are aligned with optical axes of light emitters 12A.

Figure 4B:
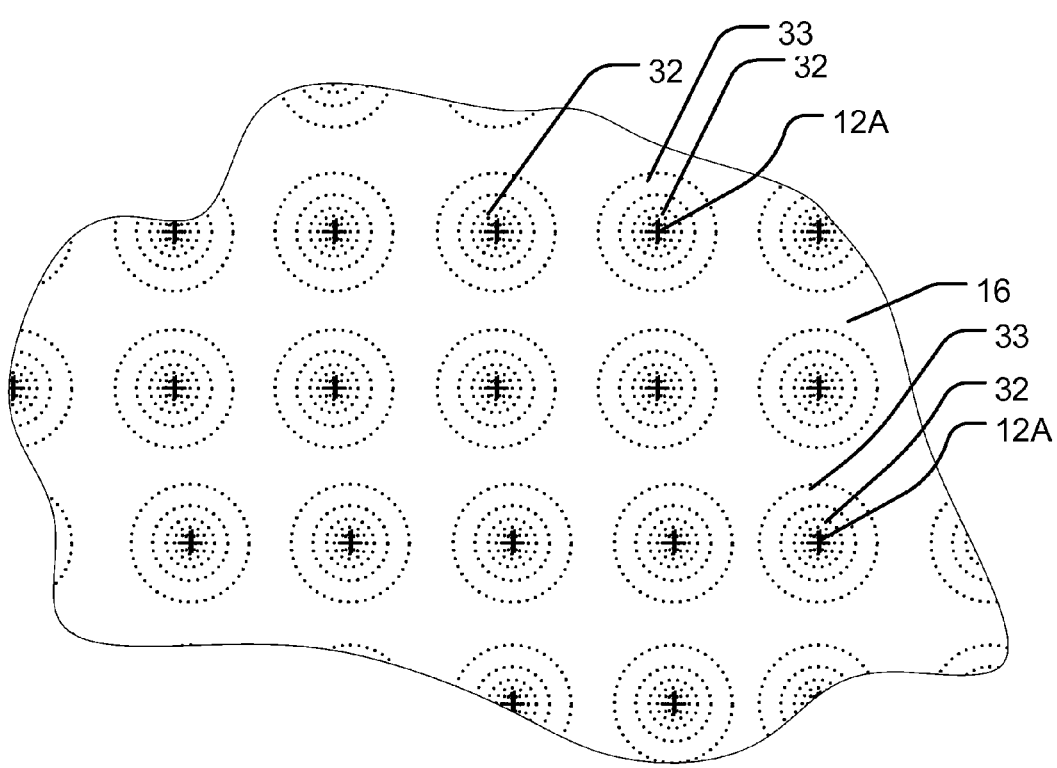
FIG. 4B is schematic plan view of a portion of a light control layer according to an example embodiment deployed over an array of light emitters.

FIG. 4B shows another example embodiment similar to FIG. 4A in which a region 32 having a higher-density of scattering centers is present directly over each light emitter 12A and an annular region 33 in which the density of scattering centers in layers 16B and/or 16C is relatively low surrounds each region 32. In some embodiments, the changes in the density of scattering centers follow smooth gradients.

Figure 4C:
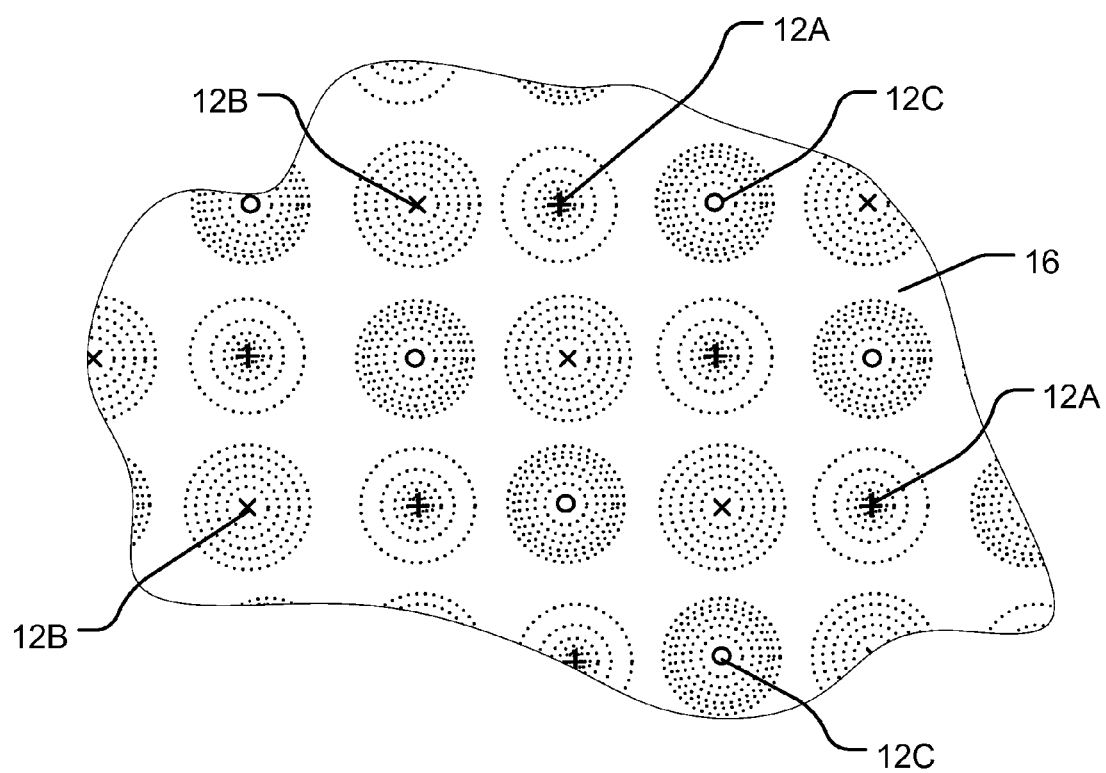
FIG. 4C is schematic plan view of a portion of a light control layer according to an example embodiment deployed over an array of light emitters.

FIG. 4C shows another example embodiment in which light source 12 comprises three distinct types of light emitters 12A, 12B and 12C having locations indicated respectively by + symbols, × symbols and ○ symbols. The different light emitters may, for example, emit light of different colors. In this embodiment, light emitters 12A, 12B and 12C are each distributed in a regular 2-dimensional array pattern but the patterns are not all the same. In this embodiment, the density of the scattering centers in layers 16B and/or 16C varies differently in the vicinity of light emitters of the different types.

In some embodiments, one or both surfaces of light control layer 16 are patterned, textured, treated or otherwise made to scatter light that interacts with the surfaces. Such patterning, texturing treatment etc. may be uniform over light control layer 16 or may have some desired spatial variations over one or both surfaces 17A and 17B of light control layer 16. For example, patterns of dimples, frosting, prism-shaped indentations, or other surface features may be formed in back and/or front surfaces 17A and 17B. As another example, patterns of light scattering material may be deposited on back and/or front surfaces 17A and 17B. A number of example ways in which surfaces of light control layer 16 may be treated to achieve desirable light distribution properties is described in co-pending U.S. patent application No. 61/241, 681 filed on 11 Sep. 2009 and entitled Methods and Apparatus for Providing Illumination to a Light Modulator, which is hereby incorporated herein by reference for all purposes. In some embodiments, layers 16B and/or 16C may each comprise one or more sublayers, and surface features may be patterned on the surfaces of the sub-layers.

Figure 15A:
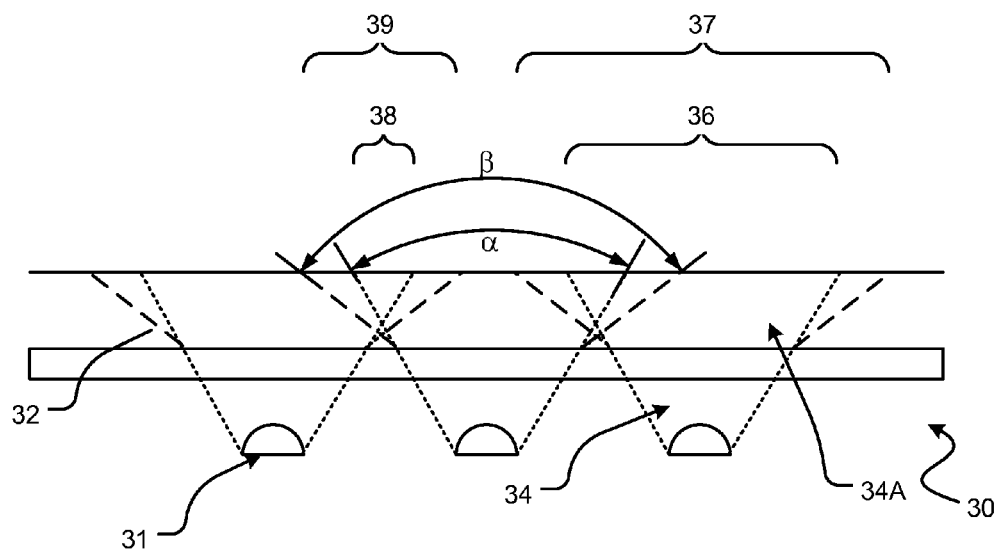
FIG. 15A is a schematic view of light in a part of a display.
Figure 15B:
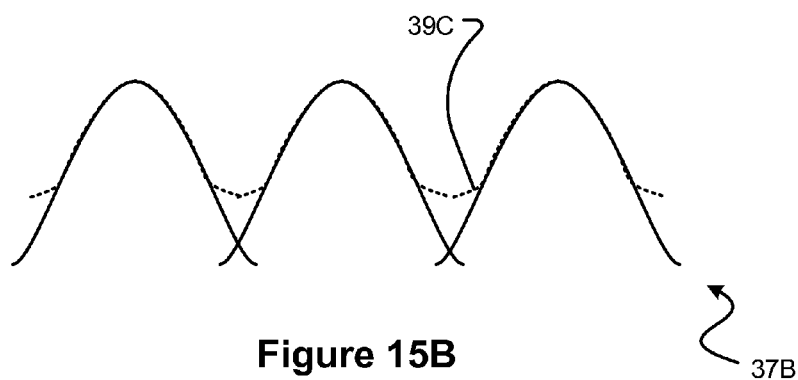
FIG. 15B is a schematic view a point spread function of light from light emitters.
Figure 15C:
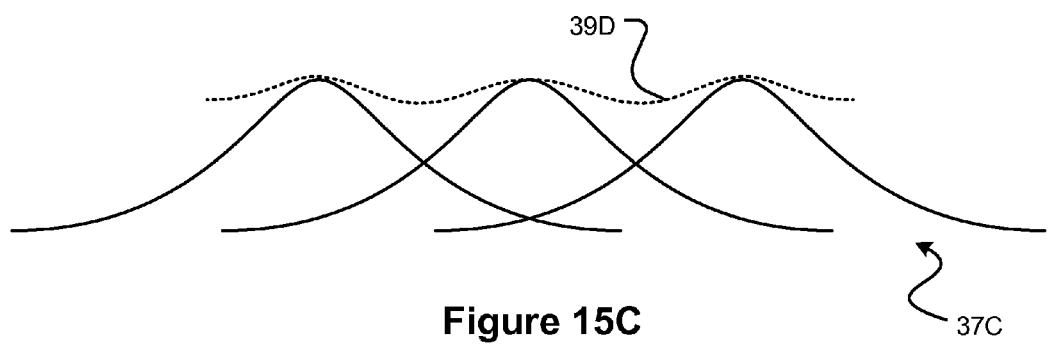
FIG. 15C is a schematic view of a spread function of light from light emitters.

FIGS. 15A, 15B, and 15C illustrate how a display that comprises an optical element 36 that increases the angular spread of light, from a light emitter, may provide sufficiently spatially-uniform light to a light modulator while permitting a relatively smaller separation between the light source and the light modulator and/or a relatively greater spacing between light emitters of the light source.

FIG. 15A is a diagrammatic illustration of light in a part of a display 34. Light emitters 35 emit light 37 in the direction of optical element 36. Light 37 from light emitters 35 passes through optical element 36 to light source-facing surface (face) of light modulator 38. The angular spread b of light 37A emerging from optical element 36 is larger than the angular spread a of light 37 entering optical element 36. The change in the angular spread causes light 37A to fall on a portion 38A of light modulator 38 that is larger than the portion 38B that light 37 would have fallen in the absence of optical element 36. The change in the angular spread of light 37 also causes overlap 39A of light 37A from adjacent light emitters 35 to be larger than the overlap 39B that would occur in the absence of optical element 36. It will be appreciated that a display may achieve the same overlap using a thinner construction by incorporating an optical element 36 that spreads light.

FIG. 15B is a diagrammatic illustration of the spread functions 37B of light 37 from light emitters 35 at light modulator 38 that would occur in the absence of optical element 36. Spread functions 37B represent the intensity of light from individual light emitters 35 along a line across light modulator 38. Envelope 39C represents the intensity of the combined light along a line across light modulator 38.

FIG. 15C is a diagrammatic illustration of the spread functions 37C of light 37A from light emitters 35 at light modulator 38 that occurs when light 37 passes through optical element 36. Spread functions 37C represent the intensity of light from individual light emitters 35 along a line across light modulator 38. Envelope 39D represents the intensity of the combined light along a line across light modulator 38.

In comparison with spread functions 37B, spread functions 37C are broader, overlap more and have a smaller intensity range. These differences indicate that providing optical element 36 between light emitters 35 and light modulator 38 causes light from light emitters 35 to be distributed over a larger area of light modulator 38. In comparison with envelope 39C, envelope 39D has a smaller range and varies more smoothly. This indicates that providing optical element 36 between light emitters 35 and light modulator 38 causes light incident at light modulator 38 to be more spatially-uniform. Accordingly, a display that comprises an optical element that spreads light, like optical element 36, may achieve sufficiently spatially uniform light with a construction that is thinner than a display that does not comprise an optical element that spreads light. This may be particularly advantageous where the display comprises a light source with individually controllable light emitters.

Optical element 36 may for example comprise one or more light management films, such as, for instance, multi-layer optical films Some examples of such films are described, for example, in U.S. Pat. Nos. 5,600,462, 6,846,089, and 7220026, which are hereby incorporated herein by reference.

Some embodiments provide optical elements that change the shape of the point spread function of light from light emitters. For example, optical elements may cause the point spread function of light from light emitters to be less spread and more locally-uniform. Some embodiments provide an optical element having optical characteristics that vary spatially. The optical characteristics may vary spatially in a manner that is periodic with a period equal to a spatial period of light emitters 12A of light source 12. In some embodiments, optical elements comprise surface features that affect light transmission through the optical element. The surface features may have a periodicity that matches a periodicity of light emitters 12A arrayed in light source 12.

Figure 16A:
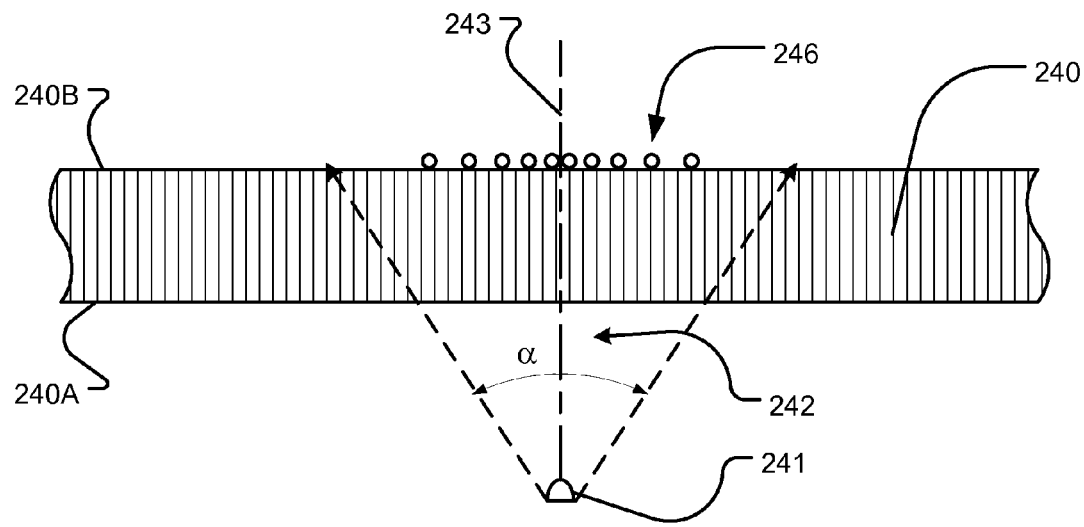
FIG. 16A is a cross-sectional schematic view of an optical element according to an example embodiment.

FIG. 16A is a cross-sectional schematic view of an optical element 240 according to an example embodiment. Light emitter 241 emits light 242 in the direction of optical element 240. The light spreads through an angle a. Light 242 enters optical element 240 at interface 240A, and exits optical element 240 at interface 240B.

Surface features 246 are located at interface 240B. In some embodiments surface features 246 are external to optical element 240. Surface features may, for example, comprise one or more materials applied to or embedded in optical element 240 or a surface treatment or texturing of optical element 240. Surface features may also comprise surface deformations, such as deformations caused by, for example, stamping, etching, pitting, abrading, localized annealing and the like. In some embodiments, an optical element is provided with both material deposits and surface deformations. In an example embodiment, the features comprise diffusing material, such as a translucent white paint applied to optical element 240 or a layer adjacent to optical element 240.

Light exiting optical element 240 through interface 240B interacts with surface features 246. In general, light interacting with one or more surface features may undergo refraction, reflection, scattering, absorption, diffraction, combinations thereof, or the like. Surface features may be configured to cause the point spread function of light from light emitters to be changed.

Figure 16B:
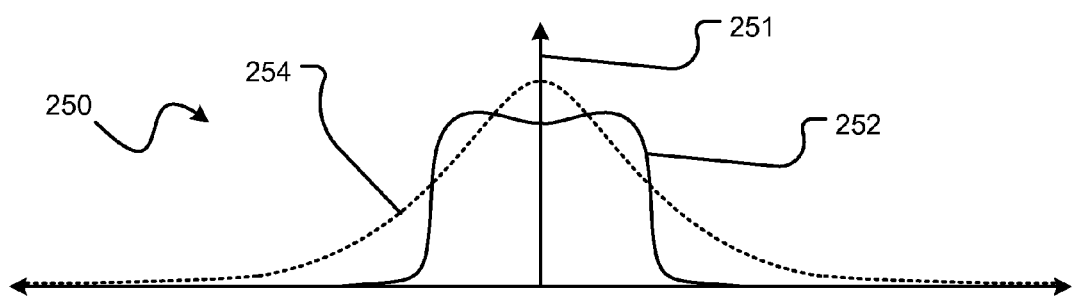
FIG. 16B is a graph of intensity of light along a line.

FIG. 16B shows a graph 250 of intensity of light along a line across a plane parallel to and distant from exit interface 240B of optical element 240. Spread functions 252 and 254 represent the intensity of light from light emitters 241 along a line parallel to surface, with light intensity increasing along axis 251. Point spread function 252 represents the intensity of light from light emitter 241 that would be observed in the absence of surface features 246. Point spread function 254 represents the intensity of light from light emitter 241 that is observed when surface features 246 that scatter light are present. Point spread function 252 is relatively narrower (less spread) and more locally uniform than point spread function 254.

Algorithms to calculate configurations and/or compositions of material deposits and/or surface texturing, modifications and the like that achieve particular effects on light are well known to those skilled in the art. These algorithms may be applied to determine configurations and/or compositions of material deposits that alter the point spread function of light from light emitters to achieve desired design goals such as optimal spread and local uniformity for a specific application. In some embodiments, surface features may be applied to change the point spread function of light from substantially Gaussian to substantially Fermi-Dirac or substantially Super-Gaussian.

In the illustrated embodiment, surface features are distributed symmetrically about the optical axis of light emitter 241 and the density of the surface features decreases with the distance from the optical axis of light emitter 241. Some light emitters have point spread functions characterized by decreasing intensity in the directions away from their optical axis. For example, point spread function 252 of light emitter 241 is generally Gaussian with maximum intensity along the optical axis of light emitter 241. Where light from such a light emitter interacts with surface features that are arranged symmetrically about the light emitter's optical axis and scatter light in a manner that decreases with distance from the optical axis of the light emitter, the relatively more intense light exiting the optical element will be relatively more affected by surface features. Where surface features scatter incident light, this arrangement tends to distribute light away from the optical axis of the light emitter. In embodiments where the composition of material deposits varies spatially, composition may vary spatially with a periodicity such that light from each light emitter interacts with essentially the same pattern surface features. In some embodiments the surface features have a spatial frequency that is equal to or a multiple of a spatial frequency of light emitters arrayed in a light source.

In the illustrated embodiment, surface features are located on one interface of optical element 240. In other embodiments, surface features are located on a plurality of interfaces of an optical element. For example, in some embodiments, surface features are located on one or more interfaces though which light enters an optical element.

Figure 17:
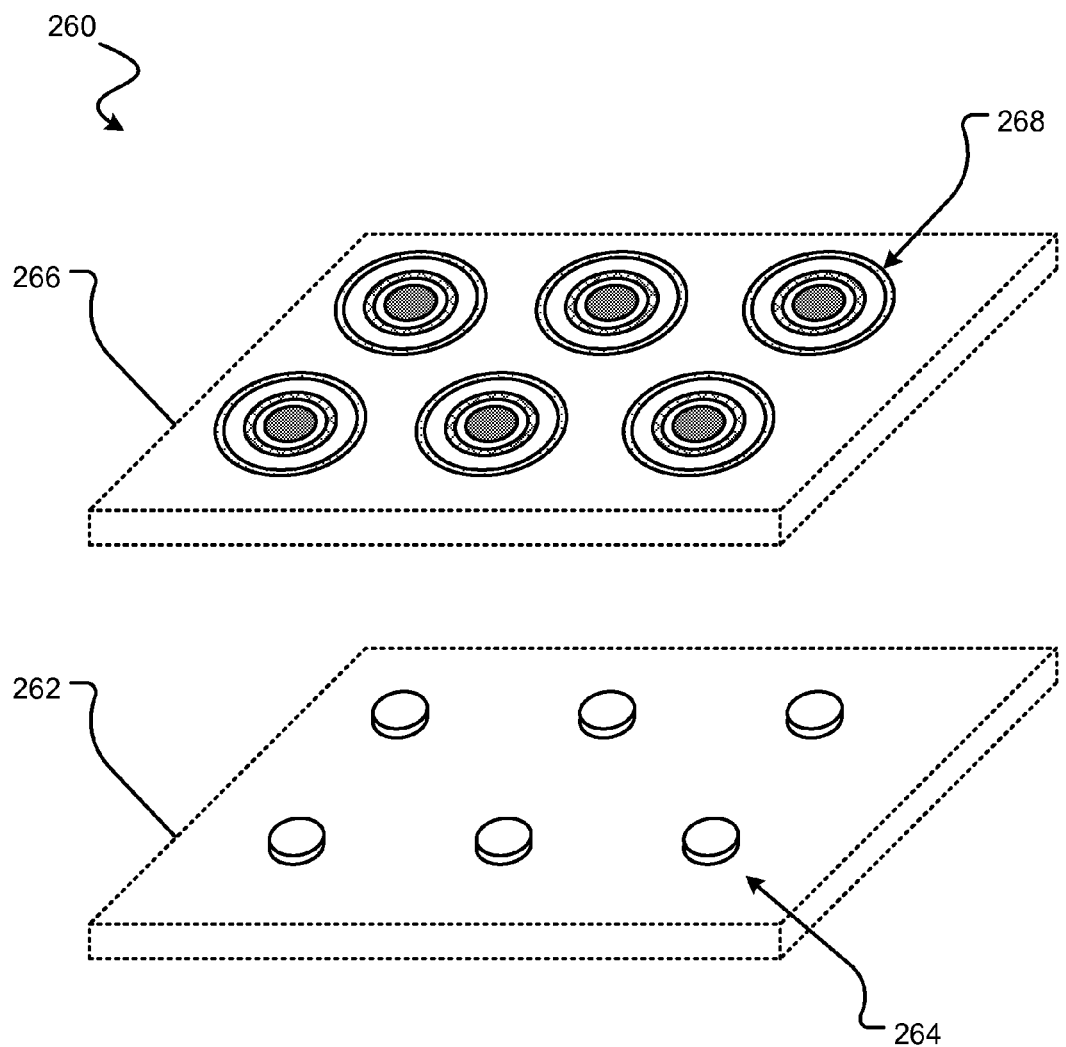
FIG. 17 is a perspective view of a part of a display according to an example embodiment.

In some embodiments, surface features are arranged on an optical element in a pattern of repeating configurations that corresponds to the arrangement of light emitters of a light source. FIG. 17 is a perspective view of a part of a display 260 according to an example embodiment. Display 260 comprises light source 262 and optical element 266. Light emitters 264 of light source 262 are configured to provide light incident on optical element 266. Optical element 266 comprises surface features 268 in a repeating arrangement that corresponds to the arrangement of light emitters 264. Each surface feature 268 is aligned with a corresponding light emitter 264.

In the example embodiment illustrated in FIG. 17, the correspondence between light emitters and repeating arrangements of surface features is one-to-one. In other embodiments, the correspondence between light emitters and repeating arrangements of surface features may be one-to-many, many-to-one, one-to-one, or a combination of these at different locations.

In some embodiments, an arrangement of light emitters is spatially-periodic and surface features are provided on an optical element with matching spatial-periodicity.

In some embodiments, surface features are arranged on a plurality of optical element surfaces such that the arrangement of surface features on one optical element surface corresponds to the arrangement of surface features on one or more other optical element surfaces. In some such embodiments, the arrangements of surface features on different optical elements surfaces may be based at least in part on the separation between the different optical element surfaces. In embodiments comprising surface features arranged on multiple optical element surfaces, the optical element surfaces may belong to one or more optical elements. In some embodiments, an optical assembly disposed in the optical path between a light source and a light modulator comprises several optical elements with surface features for changing the point spread function of light. In some such embodiments, the at least some of the plurality of optical elements having surface features are in optical contact.

Some light sources comprise light emitters that provide different colors of light. In some embodiments, surface features are arranged to correspond to light emitters that emit particular colors of light. For example, a surface feature may be configured to affect light having a particular wavelength or range of wavelengths in a particular way. Such surface features may be arranged on an optical element to correspond with light emitters that provide light of the particular wavelength or range of wavelengths.

In general, surface features may be provided in any of a wide variety of configurations. The following provides examples only of some possible configurations. Surface features 246 may comprise material deposited on the surface of optical element 240. Material deposits may comprise materials selected to achieve particular effects on light exiting an optical element, such as refraction, reflection, scattering, absorption, diffraction, combinations thereof, or the like. For example, in some embodiments material deposits may comprise dielectric material with an index of refraction different from the index of refraction of the optical element on which they are deposited in order to cause refraction of light exiting the optical element. Material deposits may comprise dielectric material having a purely real refractive index so that light exiting the optical element is not absorbed by the material. Material deposits may comprise dielectric material having a complex refractive index, so that light exiting the optical element is fully or partially absorbed. In some embodiments, a half-tone pattern of material deposits or other surface features is provided.

In some embodiments, a plurality of material deposits having different compositions are deposited on an optical element. Material deposits may comprise more than one type of material. In some embodiments, material deposits comprise layers of different materials. Materials that comprise more than one type of material may be, for example, homogeneous mixtures, colloids, suspensions, or the like. Material deposits may comprise interstitial voids, such as, for example, gas bubbles. In some embodiments, the concentration of particles and/or voids varies spatially within a material deposit. In some embodiments, material deposits comprise particles and/or voids that are not optically small, such that the deposited material causes light to be scattered. In some embodiments, material deposits comprise particles and/or voids that are optically small so that they do not scatter much of the light.

Material deposits may be dimensioned, shaped and/or arranged to achieve particular effects on light exiting an optical element. For example, surface deposits may be formed in geometric shapes, such as, lines, hatches, discs, donuts, squares, triangles or the like, in order to spatially-selectively refract, reflect, scatter, absorb and/or diffract light. The thickness of material deposits may be controlled to affect the distance that light travels in the deposit material, in order to achieve particular amounts of scattering, refraction, absorption or the like.

In some embodiments, surface features are provided by way of a patterned layer, such as a transparent and/or translucent film applied to the optical element. The patterned layer may have a spatially-varying light scattering and/or light absorbing characteristics. This spatial variation may have a periodicity matching that of light emitters in a light source. The spatial variation may be registered with light emitters of the light source.

In some embodiments, a light source and optical element are configured such that light from light emitters of the light source is reflected within the optical element. The reflection may cause light to spread within the optical element. In some such embodiments, some light may undergo total internal reflection. Where light from many different light emitters is widely spread due to repeated internal reflections, a background level of illumination may result. This background illumination may reduce the dynamic range of the display.

Internal reflection of light within an optical element can be mitigated and/or eliminated by "frustrating" the internal reflection of light at surface interfaces of the optical element. When TIR occurs at a interface between a first material and a second material, some electromagnetic energy, known as the evanescent wave, penetrates into the second material. The intensity of the evanescent wave decays exponentially with distance into the second material. TIR can be prevented, or "frustrated", by providing a third material of an appropriate refractive index positioned within the evanescent wave region. The third material can couple energy out of the evanescent wave either by transmitting (scattering) it or by absorbing it. It has been found that even though there is no evanescent wave in the absence of TIR, the intensity of partially reflected light (PIR, in analogy to TIR) can be controlled by the presence of material in the evanescent wave region.

Deposition of material in the evanescent wave region provides control of reflectance that is substantially independent of wavelength and incident angle. (See A. Webster, M. Mossman and L. Whitehead, "Control of reflection at an optical interface in the absence of total internal reflection for a retroreflective display application", App. Opt. 45(6), February 2006; M. Mossman and L. Whitehead, "A novel reflective image display using total internal reflection", J. Displays 25(5), November 2004; M. Mossman and L. Whitehead, "Controlled frustration of TIR by electrophoresis of pigment particles", Appl. Opt. 44(9), March 2005 for more on this phenomenon; and U.S. Pat. No. 6,215,920, all of which are hereby incorporated by reference for all purposes.)

In some embodiments, material is deposited to frustrate TIR and/or PIR at particular locations on or near a surface of an optical element in order that light that would otherwise be internally reflected is absorbed and/or extracted from the optical element. In some such embodiments, material is deposited at or near more than one surface of an optical element. In some embodiments, the surface of the optical element about which material is deposited is rough and/or comprises surface features, such as, for example, hemispheric and/or prismatic structures. In such embodiments, TIR and/or PIR may be frustrated by a combination of deposited material and surface geometry.

In displays with light sources that comprise arrays of light emitters, it may be desirable that material deposits not cover a large area of optical element interfaces in order that material deposits absorb and/or scatter only small amounts of light that would not be internally reflected. In some embodiments, material is deposited on the surface of an optical element on areas at which an appreciable amount of light would be internally reflected. Such areas may be defined, at least in part, by the angle of incidence of light from one or more light emitters and/or the point spread function of light from the one or more light emitters.

Figure 18A:
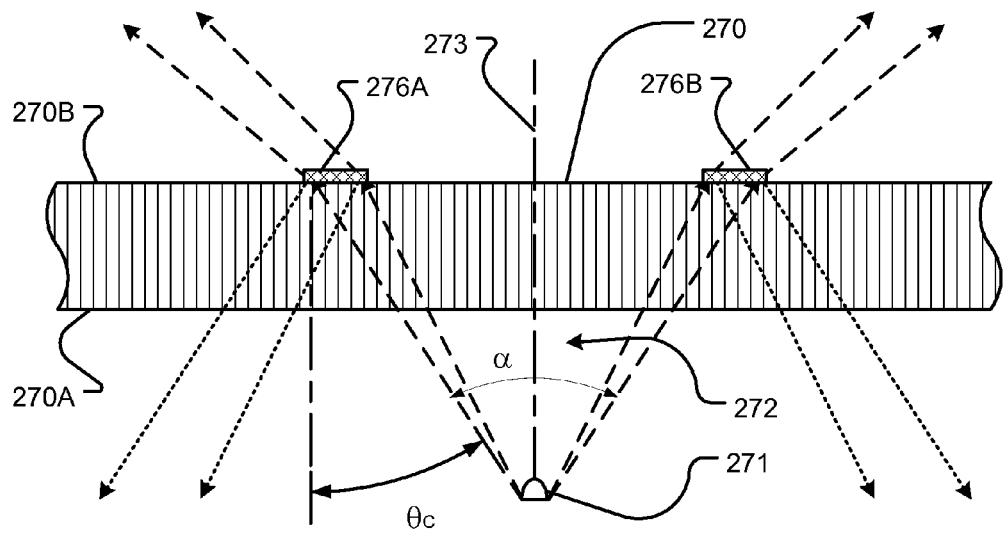
FIG. 18A is a cross-sectional schematic view of an optical element according to an example embodiment.
Figure 18B:
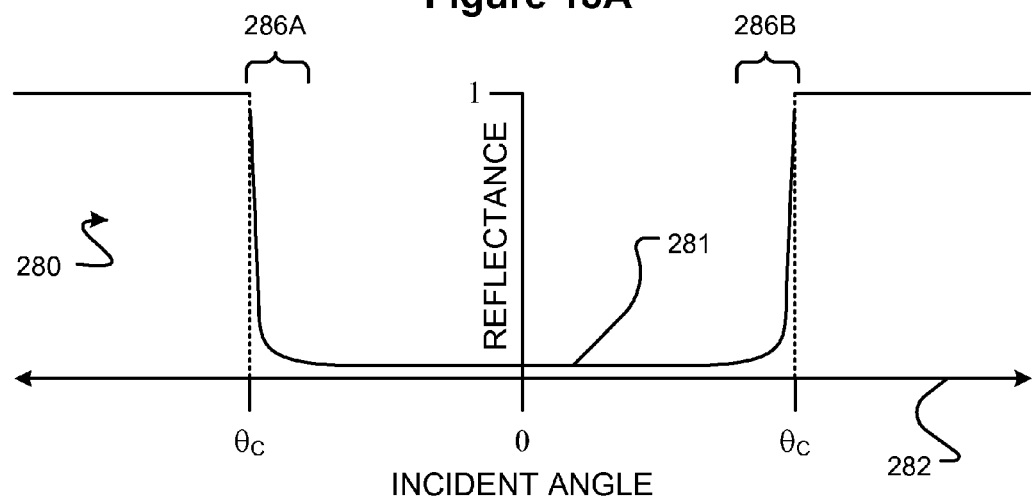
FIG. 18B is a graph of reflectance for various incident angles.
Figure 18C:
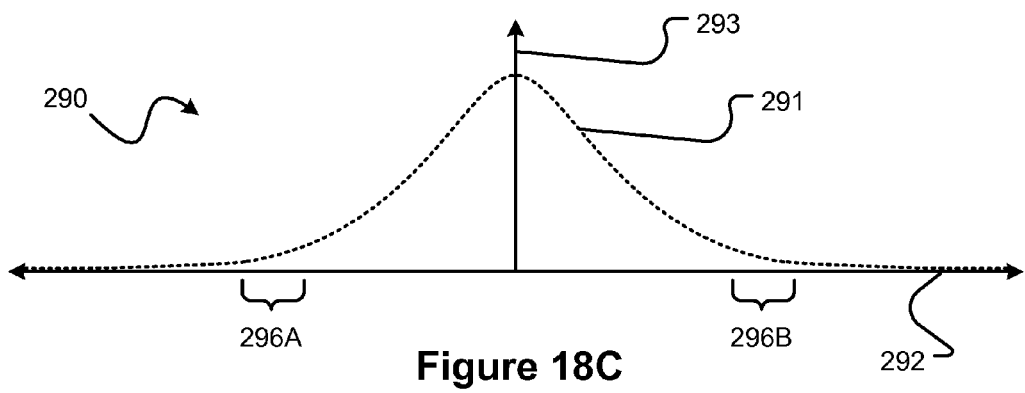
FIG. 18C is a graph of intensity of light along a line.

FIGS. 18A, 18B and 18C show, respectively, a cross-sectional schematic view of an optical element 270 according to an example embodiment, a graph 280 of the reflectance at the interface of the optical element for various incident angles, and a graph 290 of intensity of light along a line across an interface of the optical element. Light emitter 271 emits light 272 in the direction of optical element 270 in an angle a. Light 272 enters optical element 270 at interface 270A and crosses optical element 270 to interact with interface 270B. Material deposits 276A and 276B are in the evanescent wave region of interface 270B, which is on the side of interface 270B external to optical element 270. Material deposits 276A and 276B are patterned on portions of interface 270B at which an appreciable amount of incident light is reflected.

Graph 280 comprises curve 281 which indicates reflectance as a proportion of incident light at interface 270B for light at a range of angles of incidence. The domain 282 of graph 280 is non-linear such that it corresponds to a linear domain of distances along interface 270B from axis 273. (Because the dimension of light emitter 271 is sufficiently small that light emitter 271 can be treated as a point light source, the angle of incidence of light from light emitter 271 at a point along interface 270B can be approximated as the arcsine of the distance between the point of incidence and the point at which light is normally incident at interface 270B.) FIG. 18A and FIG. 18B are dimensioned and aligned so that points on the corresponding linear domain of graph 280 are matched with points along interface 270B.

Curve 281 indicates that the reflectance of light from light emitter 271 at interface 270B is uniformly low for low incident angles. Sub-domains 286A and 286B each comprise a continuous a range angles of slightly less than and including the critical angle. Curve 281 indicates that reflectance of light from light emitter 271 at interface 270B increases dramatically across sub-domains 286A and 286B. The location of material deposit 276A on interface 270B corresponds to sub-domain 286A, and the location of material deposit 276B on interface 270B corresponds to sub-domain 286B. Accordingly, material deposits 276A and 276B are at portions of interface 270B where reflectance of light from light emitter 271 is appreciable.

Graph 290 comprises curve 291 which indicates the intensity of light at points along interface 270B. FIG. 18A and FIG. 18C are dimensioned and aligned so that points in domain 292 of graph 290 are matched with points along interface 270B. Curve 291 indicates that the intensity of light along interface 270B follows a Gaussian distribution centered about the optical axis 273 of light emitter 271. Curve 291 indicates that the intensity of light from light emitter 271 at interface 270B is low across sub-domains 296A and 296B. Curve 291 indicates that the intensity of light from light emitter 271 at interface 270B is negligible at locations at distances from axis 293 greater than the upper limits of sub-domains 296A and 296B. The location of material deposit 276A on interface 270B corresponds to sub-domain 296A, and the location of material deposit 276B on interface 270B corresponds to sub-domain 296B. Accordingly, material deposits 276A and 276B are at portions of interface 270B where the intensity of light from light emitter 271 is low.

It will be appreciated that material deposits 276A and 276B cover portions of interface 270B at which the intensity of reflected light would be greatest. At points along interface 270B nearer to axis 273 than material deposits 276A and 276B, the reflectance of light from light emitter 271 is low because the incident angles are sufficiently less than the critical angle. At points along interface 270B farther from axis 273 than material deposits 276A and 276B, the intensity of light at interface 270B is negligible, so that even if the light undergoes total internal reflection, the intensity of the reflected light will be negligible.

It will be appreciated that where light emitter 271 is one of a plurality of light emitters arranged in an array, material may be deposited over optical element 270 in a pattern of repeating configurations corresponding to the arrangement of the light emitters. In some embodiments, light emitters and optical elements comprising material deposits are configured so that light rays critically incident and nearly critically incident on the optical element surface that comprises material deposits are of low intensity and are absorbed by material deposits.

In some embodiments, an optical assembly disposed in the optical path between a light source and a light modulator comprises several optical elements with material deposits for frustrating TIR. In some such embodiments, at least some of the plurality of optical elements with material deposits are in optical contact.

Figure 19:
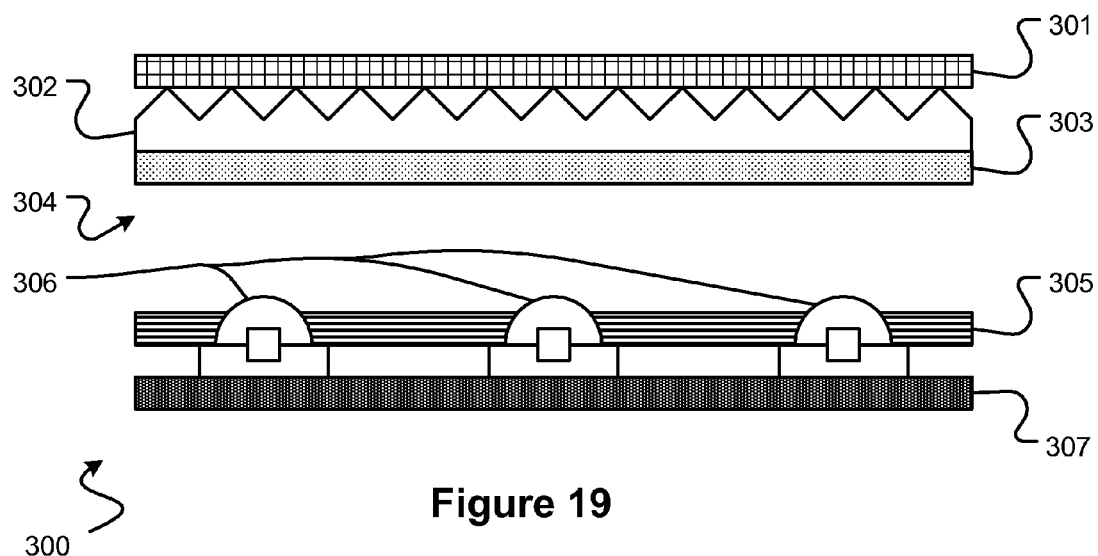
FIG. 19 is a schematic view of a conventional liquid crystal display stack.

The use of material deposits to couple light out of optical elements also has application in improving the local spread of light from an individual light emitter while maintaining a thin display. FIG. 19 shows a conventional liquid crystal display stack 300. Stack 300 comprises an LCD light modulator 301, a microstructured brightness enhancing film 302, a diffuser 303, a cavity 304, a reflective film 305, LEDs 306 and a circuit board with appropriate thermal management solution 307. Brightness enhancing film 302 may comprise more than one film, for example, it may comprise a single layer of Vikuiti™ dual brightness enhancing film (DBEF) and a single layer of Vikuiti™ brightness enhancing film (BEF).

Brightness enhancing film 302 and diffuser 303 typically have low effective transmission, and the bulk of light reflects off of them. To improve light transmission from the stack, reflective film 305 has very high reflectance. High reflectance is important because a light ray may undergo a large number of reflections before achieving transmission through brightness enhancing film 302 and diffuser 303. For example, in a conventional LCD stack with a single layer of DBEF, single layer of BEF and a standard diffuser, only 30% of incoming light rays will transmit through the diffuser (65% will be reflected), only 50% of those transmitted rays will transmit through the BEF (50% of the transmitted rays will be reflected), and only 50% of the rays transmitted through the BEF will be transmitted through the DBEF (50% will be reflected). Thus, only approximately 8% of incident light rays reach the back of the LCD.

Nearly all of the rays that do not reach the back of the LCD are reflected back into cavity 304. With a high reflectance reflective film, approximately 98% of these rays are reflected back to the top of the LCD stack, where 8% will be transmitted to the back of the LCD and the remainder reflected again. The process of multiple reflections between the upper stack layers and reflective film 305 causes the light that is eventually transmitted to the back of LCD 301 to be more diffuse.

One type of highly reflective film uses a stack of very thin layers in which adjacent layers have different indices of refraction. These films reflect incoming rays through total internal reflection rather than metallic reflection. These films are not designed to reflect incoming light at angles that are almost parallel to the surfaces of the film and light incoming at such angles is transmitted out of the film. Even though such grazing rays do not occur in conventional optical designs, they can be artificially created by depositing material on or near the surface of the film. Material deposited on or near the surface of the film will scatter light incident on the surface in many directions. Some of the scattered light will naturally be grazing incident rays. These "manufactured" grazing incident rays will be transmitted out of the film.

Figure 20:
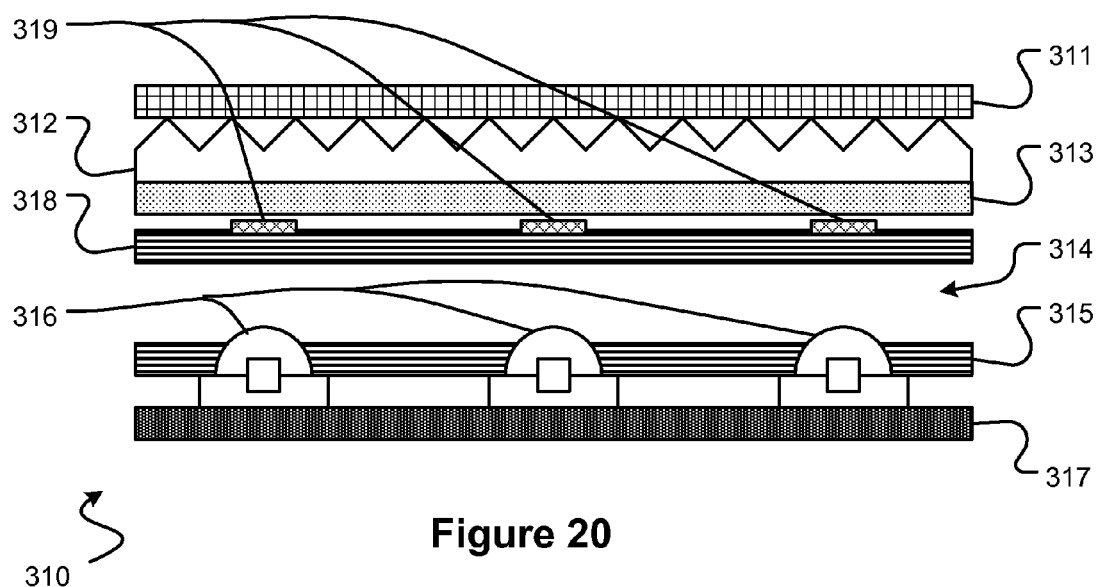
FIG. 20 is a schematic view of a liquid crystal display stack according to an example embodiment.

This characteristic can be exploited to reduce the depth of the cavity in a locally dimming display while increasing local uniformity and preserving a relatively narrow spread for light from individually controllable light emitters of a light source. FIG. 20 shows an LCD stack 310 according to an example embodiment. Stack 310 comprises an LCD light modulator 311, a microstructured brightness enhancing film 312, a diffuser 313, a cavity 314, a reflective film 315, LEDs 316, and a circuit board with appropriate thermal management solution 317. Stack 310 also comprises a second reflective film 318 with material deposits 319 on its surface.

Because cavity 314 is more reflective than cavity 304, it is relatively more spatially efficient in achieving diffusion. Consider that after each reflection in a parallel plane reflector optical cavity, a light ray travels some distance parallel to the walls of the cavity as it crosses the cavity. This travel spreads the light in the cavity. A light ray in a relatively more reflective cavity will undergo a greater number of reflections before being transmitted. In comparison with light in a less reflective cavity with the same spacing between reflectors, light in a more reflective cavity will travel a greater distance in direction parallel to the plane of the reflectors. Because the distance that a light ray travels in the direction parallel to the planes of the reflectors is a function of the angle of reflection and the distance between walls of the cavity, a more reflective cavity can achieve the same spreading of light as a less reflective cavity with a smaller spacing between reflectors. As a result, stack 310 can achieve the same light spreading as cavity 300 in with a more compact arrangement.

Light is extracted from optical cavity 314 by material deposits 319 on reflective film 318. In other embodiments, material may be deposited on reflective film 315, but it is preferable that material is deposited on the reflective film 318 that is nearest LCD light modulator 311. The configuration of the material deposits determines the pattern of light extracted from cavity 314, and thus determines, in part, the pattern of light on the LCD light modulator 311. Material deposits 319 are patterned into extraction features that correspond to individual LEDs 316, so that the amount of light extracted by each feature corresponds to the intensity of a corresponding LED. Algorithms that may be applied to calculate configurations of material deposits that achieve particular output luminance profiles in iterative reflection system like these are well known to those skilled in the art. Patterns for extractors for light guides can be readily applied to this system.

It will be appreciated that material deposits or other patterning may be applied to standard films simply and inexpensively. In comparison with creating apertures in a film, arranging material deposition on a film may be simpler and more easily adapted to specific applications (e.g., particular arrangements of light emitters). In comparison with partially reflective films, highly reflective films with patterned material depositions may provide more precise control of output luminance profiles.

In some embodiments a display comprises an optical element having scattering centers distributed in its bulk in addition to or instead of surface features as described above. The optical element may comprise, for example, a layer, sheet, film, multi-layer optical film or the like. The bulk-distributed scattering centers may have a density that varies spatially over the optical element. The spatial variation may have a periodicity that matches a spatial periodicity of light emitters in a light source. The spatial variation may have a periodicity that is registered with optical axes of the light emitters. The bulk-distributed scattering centers and/or surface features may be arranged to reduce a ratio of optical energy in tails of point spread functions of the light emitters to optical energy in central portions of the point spread functions of the light emitters. The bulk-distributed scattering centers and/or surface features may be arranged to broaden central portions of the point spread functions of the light emitters.

Using features to control the output luminance profile of light from light emitters can simplify the determination of light characteristics for use in controlling a light modulator. In some embodiments, the determination of characteristics of light from light source 12 at points on spatial light modulator 14 comprises referring to or generating a light characteristic map.

Light characteristic maps may be generated, for example, from a light field simulation of the light from light emitters of a light source. In such light field simulations, suitable models may be applied to determine the characteristics of light emitted by each light emitter in response to applied driving signals and the characteristics of light from individual light emitters at the spatial light modulator. Such simulations may comprise applying models to determine the effect of optical elements on light from light emitters. Generating a light characteristic map for a light modulator may comprise combining light characteristic maps for light from many individual light emitters that provide light to the light modulator.

Figure 21:
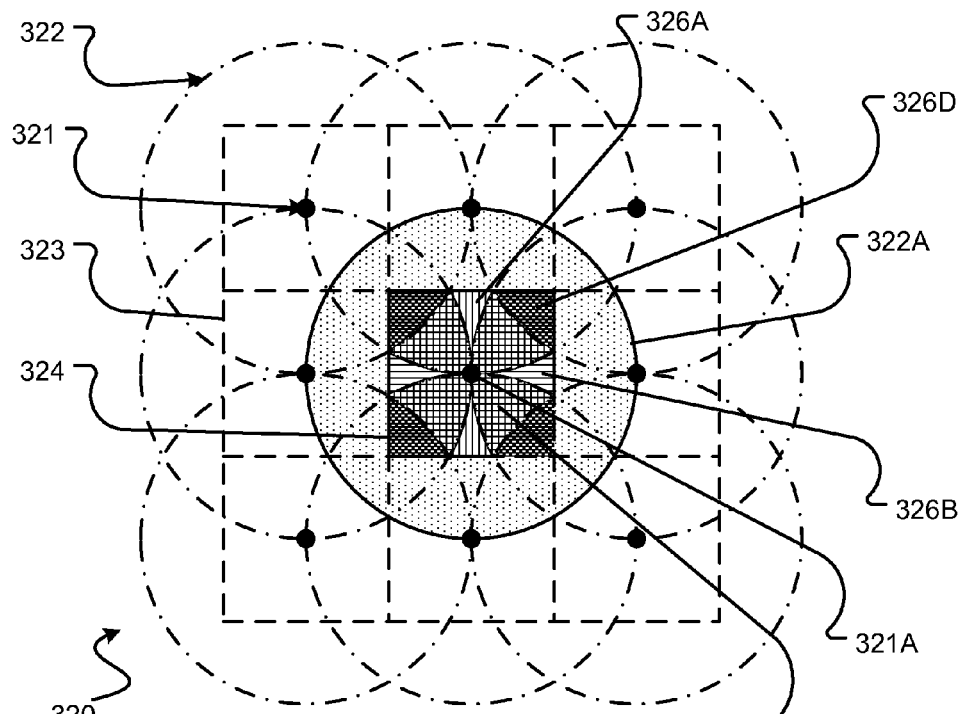
FIG. 21 is a diagram of a pattern of light from several light emitters on a light modulator.

Characteristics of light from a light source at a pixel of a spatial light modulator may be extracted from a light characteristic map and used to determine the amount of light that should be passed by the pixel in order to correctly display a part of a desired image. For example, a plurality of light characteristic maps corresponding to different sets of light source driving values may be stored in a memory, and the appropriate light characteristic map (or maps) accessed via a lookup table using light source driving values as a key. Where the desired image is a color image, the light characteristic map may also be used to determine the amount of color filtration (if any) that should be applied by each of pixel of light modulator to display the desired image.

Where light from many light emitters overlaps at points on a display, the generation of a light characteristic map may be computationally expensive, and storing light characteristics maps corresponding to a range of light source driving values may require a large amount of memory. FIG. 21 is a diagram of a pattern of light from several light emitters on a light modulator. In the particular example shown in FIG. 21, the radii of circular areas 322 are equal to the spacing between adjacent light emitters 323. As a result, light from adjacent light emitters overlaps at particular areas of the light modulator. Pixels inside block 324 are closer to light emitter 321A than any other light emitter. Light emitter 321A projects illumination on circular area 322A. Within block 324, pixels in regions 326A and 326B are illuminated by light from light emitter 321A and one other light emitter. Pixels in region 326C are illuminated by light from light emitter 321A and two other light emitters. Pixels in region 326D are illuminated by light from light emitter 321A and three other light emitters. Pixels directly aligned with light embitter 321A are illuminated by light from light emitter 321A and four other light emitters.

Figure 22:
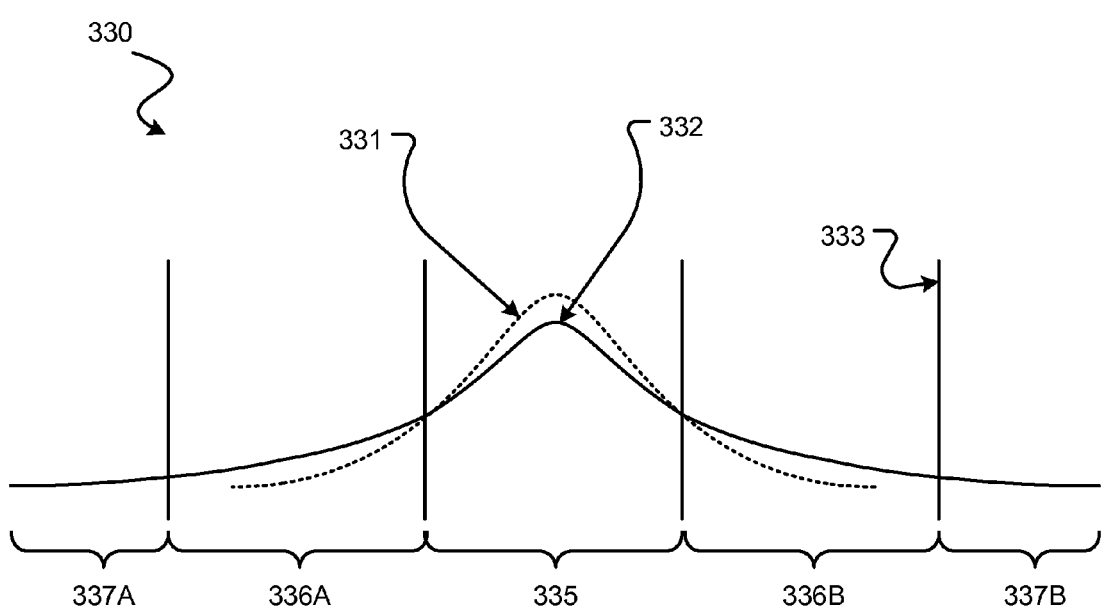
FIG. 22 is a diagram of point spread functions overlaid on a grid.

FIG. 22 shows a diagram 330 of point spread functions 331 and 332 overlaid on a grid 333. Point spread function 331 is characteristic of the intensity of illumination at a line across a light modulator from a light emitter arranged within grid 333 in a manner analogous to the arrangement of light emitter 321A in a grid of FIG. 21. Point spread function 332 is characteristic of the intensity of illumination at the same line across the light modulator from the same light emitter where the light passes through an optical element that increases the spread of incident light, such as, for example, a diffuser, en route to the light modulator.

In comparison with point spread function 331, point spread function 332 is broader and has a smaller intensity range. Whereas point spread function 331 covers only grid areas 335, 336A and 336B, point spread function 332 covers grid areas 335, 336A, 336B, 337A and 337B. In determining the characteristics of light at a pixel in grid area 337A, it would not be necessary to consider the light characterized by point spread function 331, but it would be necessary to consider the light characterized by point spread function 332. Accordingly, an optical element that increases the spread of incident light increases the number of pixels affected by the light, and this results in a corresponding increase in the complexity of determining the characteristics of light at the pixels.

Where a light characteristic map is generated for a target body of pixels by combining emitter-specific light characteristic maps, an optical element that increases the spread of incident light increases the size of emitter-specific light characteristic maps. As a result, the average number of emitter-specific light characteristic maps that must be combined to determine the light characteristic map at points on the light modulator is increased. Because a change to any one of the emitter-specific light characteristic maps affects the result of every combination of emitter-specific light characteristic maps that comprises the changed light characteristic map, the memory required to store multiple light characteristic maps corresponding to different sets of driving values also increases. By using surface features to reduce the spread of light from light emitters, the number of light emitters that must be accounted for in generating light characteristic maps may be reduced in some embodiments. As a result, the computational and storage requirements of using light characteristic maps to determine driving values for a light modulator may also be reduced.

In some embodiments, the driving signals provided to a light modulator are based at least in part on a determination of light characteristics at the light modulator that takes into account the effects of surface features on light exiting an optical element.

Optical elements according to embodiments that comprise surface features may be integrated with light sources, such as, for example, light sources. Aspects of the invention may be provided in the form of a program product. The program product may comprise any medium which carries a set of computer-readable information comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable information on the program product may optionally be compressed or encrypted.

A controller such as controller 28 may comprise processors that execute software instructions such as microprocessors, image processors, graphics processors, digital signal processors, CPUs or the like; hard-wired logic circuit or logic pipelines of the like; configurable logic circuits such as suitably configured field-programmable gate arrays (FPGAs); combinations of the above, or the like. The controller may comprise a functional element configured to compute a distribution of light from a light emitter at the spatial light modulator wherein the distribution of light is a distribution resulting from the modification of a point spread function of the light emitter by the presence of the optical element with its spatially-varying optical characteristics. Output from this functional element may be applied to determine an overall distribution of light over the controllable elements of a spatial light modulator. The overall distribution may be applied in conjunction with image data to determine settings for the controllable elements of the spatial light modulator.

Figure 5:
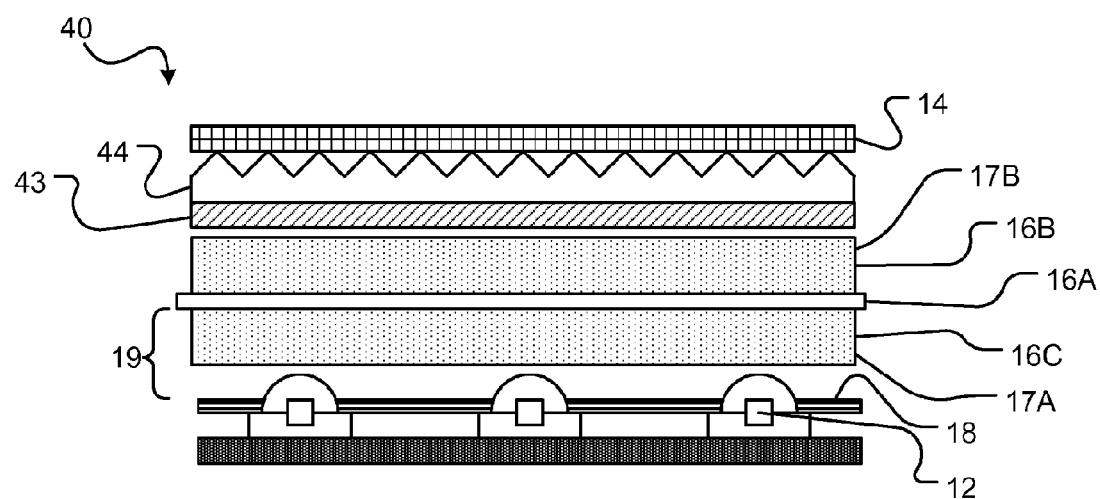
FIG. 5 is a schematic cross-section of a portion of a display according to an example embodiment.

Displays according to some embodiments may comprise optical stacks having components in addition to light control layer 16. For example, FIG. 5 is a schematic cross section through a portion of a display 40 having an optical stack 42 which, in addition to light control layer 16, comprises a diffuser 43 and a dual brightness enhancing film 44. In some embodiments, diffuser 43 partially re-collimates light from layer 16.

In some embodiments, light control layer 16 in combination with reflector 18 advantageously provides a desired point spread function for light emitters of light source 12 in a relatively thin package. For example, in some embodiments the display thickness (i.e. the distance between reflector 18 and the front surface of light modulator 14) is ½ inch (approximately 1.25 cm) or less and in some embodiments the distance between reflector 18 and the front surface of light modulator 14 is ¼ inch (approximately ⅝ cm) or less. In some embodiments, a thickness of layer 16C of light control layer 16 makes up at least 60%, in some embodiments, at least 80% of a thickness of optical cavity 19.

The effectiveness of light control layer 16 at spreading light emitted by localized light emitters over corresponding areas of light modulator 14 in a desired manner while preventing most light from any particular light emitter from spreading very far can also facilitate achieving desired image quality with fewer, more widely-spaced, light emitters than would otherwise be required. This is a particular benefit in embodiments where individual light emitters are controlled in response to image data (for example to provide local dimming of light source 12).

In some embodiments light emitted by an individual light emitter is concentrated within a corresponding area of light modulator 14 which has a diameter approximately equal to 6 times a display thickness. For example, a display may have a display thickness of approximately 6 mm and most of the light from a light emitter may be concentrated within a circle having a radius of 18 mm. In some embodiments more than 50% (more than 55% in some embodiments) of the light emitted by the light emitter which reaches light modulator 14 is concentrated within this circle. In some embodiments, individual light emitters of light source 12 are spaced apart from their closest neighbors by distances that are within ±10% of the radius of a circle within which 55% of the light from the light emitters are concentrated at light modulator 14.

Figure 6:
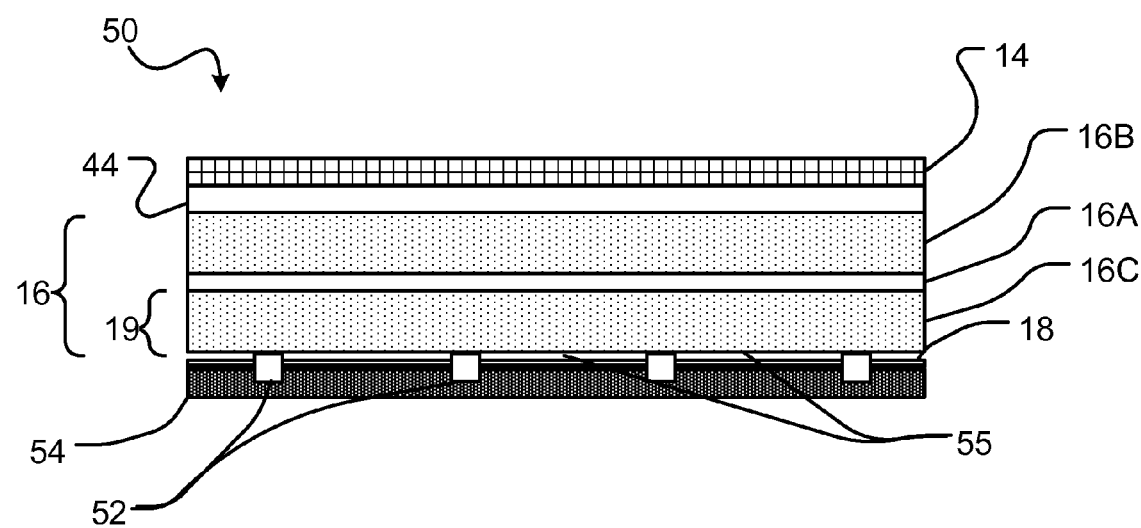
FIG. 6 is a schematic cross-section of a portion of a display according to an example embodiment.

FIG. 6 shows an example display 50 which is thin and lacks any large air gaps between light emitters 52 of light source 12 and light modulator 14. In this embodiment, light emitters 52 are in physical contact with light control layer 16. In some embodiments, light emitters 52 may be in optical contact with layer 16. An optical gel, resin, or the like may be provided to facilitate optical contact between emitters 52 and light control layer 16 or otherwise enhance the transmission of light from emitters 52 into light control layer 16. In some embodiments, some or all of the layers of display 50 are bonded together.

The absence of any large air gaps in this embodiment facilitates a mechanically robust construction. In the illustrated embodiment, a structural substrate 54 provides support to light control layer 16 by way of light emitters 52. Light emitters 52 may project by a small distance past reflector 18 to act as spacers to provide a thin air gap 55 between reflector 18 and light control layer 16. This air gap may facilitate maximizing the reflectivity of reflector 18 especially in the case that reflector 18 comprises an ESR layer such as a later of 3M Vikuiti™ ESR film. In other embodiments, alternative spacers may be provided. In some embodiments air gap 55 is not present.

A display 50 as illustrated in FIG. 6 may provide some advantages over displays of the type that have a significant air gap between light source layer 12 and light modulator 14. One advantage is that parallax issues are reduced and the viewing angle through which displayed images have good quality can be increased.

Figure 7:
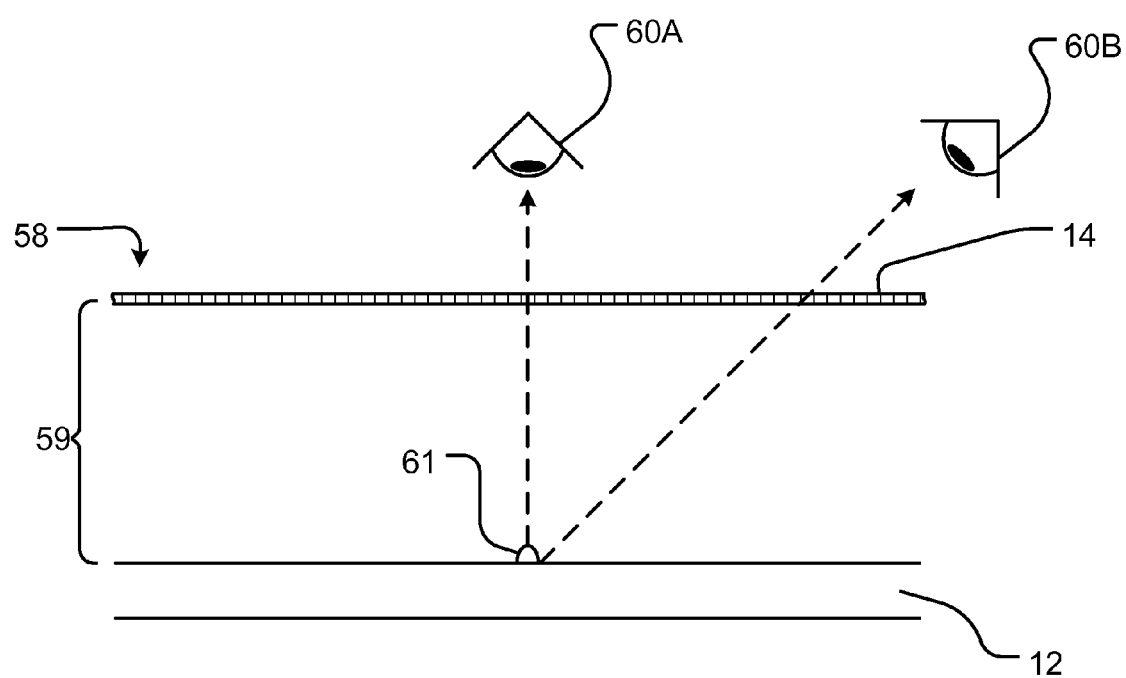
FIG. 7 is a schematic cross-sectional depiction of an optical path between a light source and light modulator.

FIG. 7 illustrates schematically a display 58 in which a large air gap 59 is included in an optical path between light source 12 and light modulator 14. To an observer at viewing angle 60A, pixels of light modulator 14 are illuminated by corresponding light emitters 61 of light source 12 that are directly behind the pixels. To an observer at viewing angle 60B pixels of light modulator 14 are illuminated by light emitters that are not directly behind the pixels. Where the light emitters are individually controlled in response to image data (as, for example, in a local dimming display) this apparent misalignment to a viewer at viewing angle 60B can result in undesirable perceptible visual artefacts.

By comparing FIGS. 6 and 7, one can see that the parallax effects are reduced in the embodiment of FIG. 6 both because display 50 is thinner than display 58 and also because the light scattering provided by light control layer 16 close to light modulator 14 helps to make the appearance of images displayed display 50 vary less with angle than does the appearance of images on display 58. In some embodiments, parallax effects are also reduced as a result of layer 16 causing light incident on modulator 14 to be more Lambertian.

Figure 8:
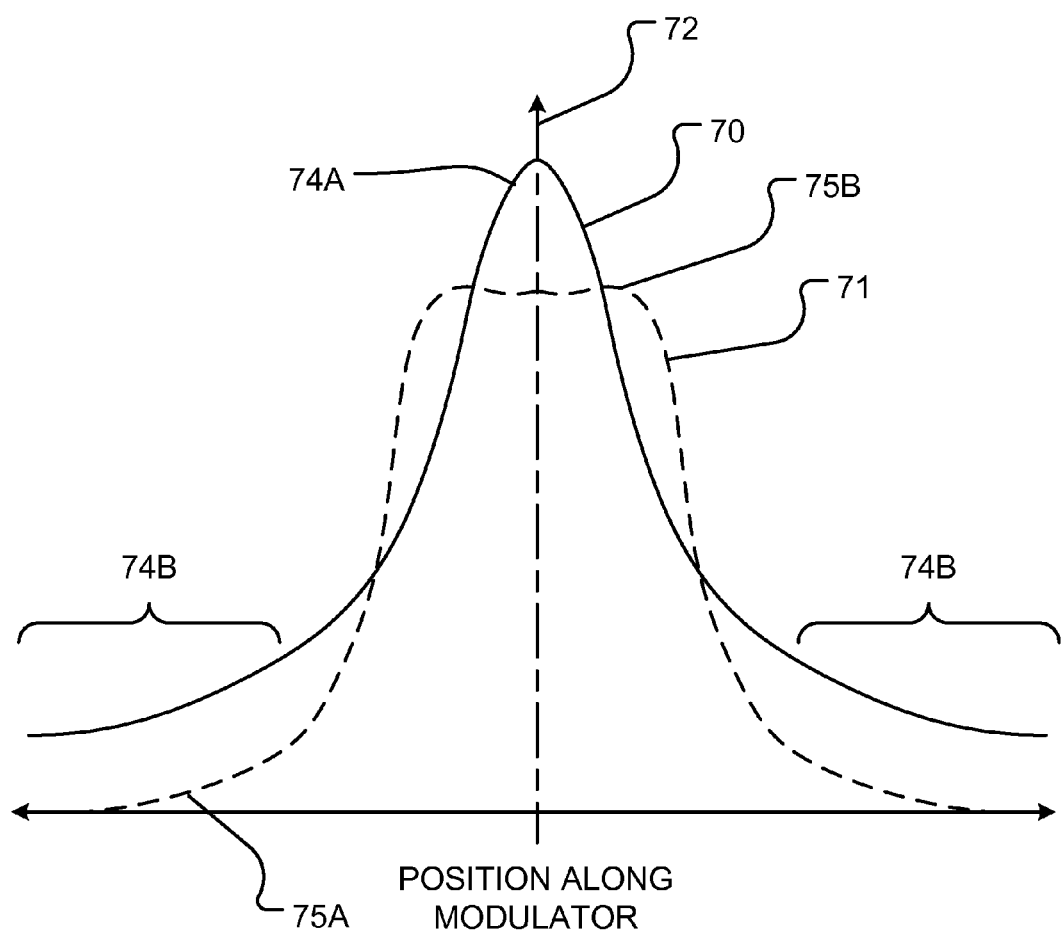
FIG. 8 is a graph of light intensity as a function of position on a light modulator for typical and enhanced point spread functions of a single light emitter.

Appropriate design of light control layer 16 can assist in shaping point spread functions which define how light from individual light emitters is distributed over light modulator 14. FIG. 8 is a plot of light intensity as a function of position on light modulator 14 that compares a typical point spread function 70 to an enhanced point spread function 71. Line 72 indicates the optical axis of the light emitter. In typical point spread function 70, light is distributed according to a bell-shaped distribution having a curved peak region 74A and extended tail regions 74B. Tail regions 74B contain a significant proportion of the light emitted by the light emitter that reaches the light modulator 14. By contrast, in enhanced point spread function 71, tails 75A are suppressed and peak 75B is softened. A suitable distribution of scattering centers in light control layer 16 may both soften peaks of point spread functions and suppress tails of point spread functions.

FIGS. 8A and 8B illustrate that, where light from light emitters is distributed according to enhanced point spread function 71 and the light emitters are appropriately spaced apart, then a light field can be provided in which the light varies smoothly. In the light field, the light intensity at any point on light modulator 14 is the sum of the light reaching that point from all light emitters of light source 12. In FIG. 8A, all of the light emitters are being operated at the same output level. In FIG. 8B, the output level of some light emitters has been reduced. From FIG. 8A, it can be seen that the softening of the peaks of point spread functions facilitates achieving a reasonably uniform light field with relatively widely-spaced light emitters. In this example, the light emitters are spaced apart by a distance that is substantially equal to the full-width at half maximum of the point spread functions. From FIG. 8B it can be seen that the suppression of tails of point spread functions facilitates greater contrast between the darkest and brightest parts of the light field and facilitates achieving a transitions from bright to dark over shorter distances.

Figure 9:
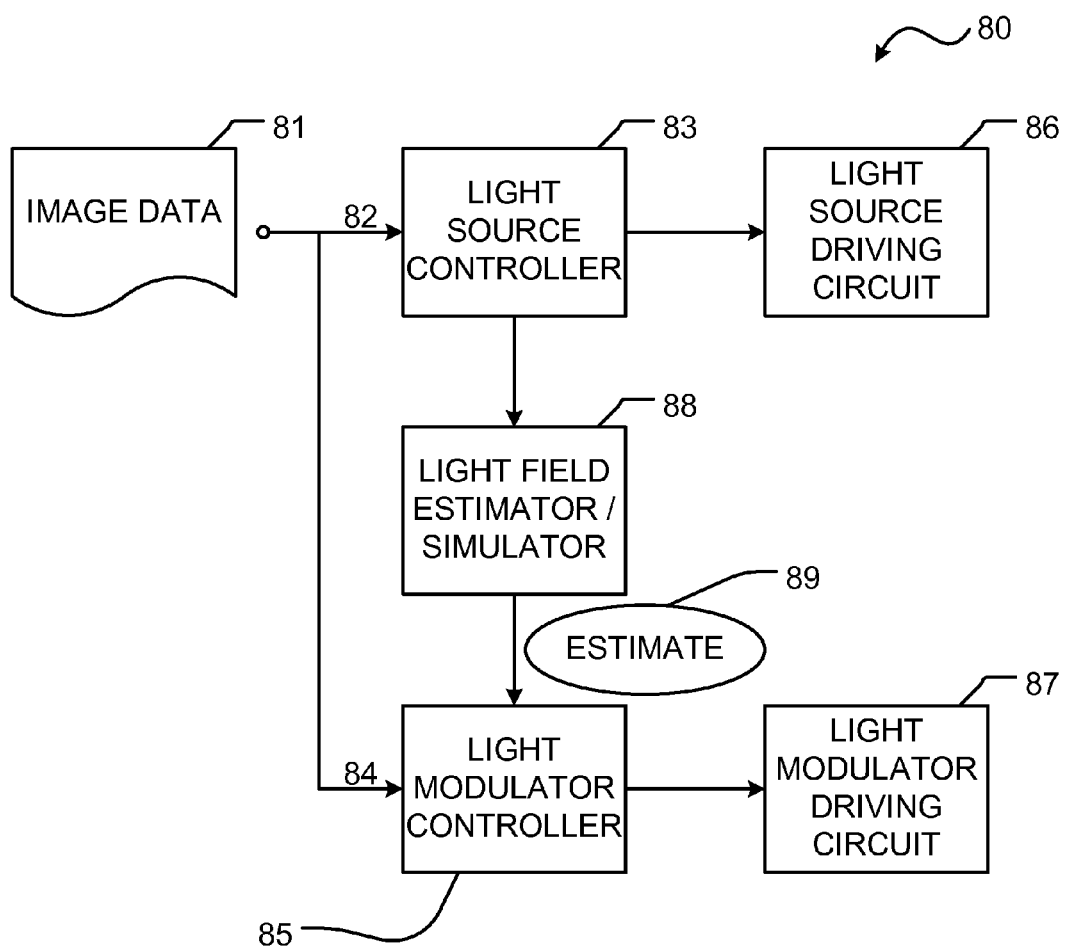
FIG. 9 is a block diagram of a control system for controlling a display.

FIG. 9 shows a control system 80 which gives an example of a possible control architecture for a display as described herein. Image data 81 is obtained at an input 82 of a light source controller 83 and an input 84 of a light modulator controller 85. Light source controller 83 and light modulator controller 85 respectively generate control signals to control a light source driving circuit 86 and a light modulator driving circuit 87. The control signals for light source 12 may specify directly or indirectly driving parameters to be applied in driving individual light emitters or groups of light emitters of light source 12. The control signals for light modulator 14 may specify directly or indirectly the amount of attenuation of light to be applied by each controllable element (e.g. each pixel or subpixel) of light modulator 14.

A light field simulator 88 receives control signals for light source 12 and, based on those control signals estimates a light field at light modulator 14. Light field simulator 88 incorporates a model of the point spread functions of light emitted by light emitters of light source 12 and passing through the optical stack, including light control layer 16. The model may comprise a function, a parameterized function, a lookup table, or the like, for example. Light field simulator 88 provides a light field estimate 89 to light modulator controller 85. Light modulator controller 85 derives control signals for light modulator 14 based on the image data 81 and on the light field estimate 89.

In embodiments where a light control layer 16 attenuates tails of point spread functions, light field simulations performed by light field simulator 88 may be simplified and made more accurate. Because point spread functions with attenuated tails correspond to effectively illumination of smaller areas on light modulator 14, better models for point spread functions may be used (e.g., mathematical functions that avoid inaccurate extrapolations and that "cut-off" less, or none, of the actual point spread function tails to reduce computational complexity) and the point spread functions of fewer light emitter need to be accounted for in simulating light fields at particular locations on light modulator 14. This permits the light field simulation to be performed more quickly and/or with simpler, slower hardware and/or with less memory than might otherwise be required.

Figure 10:
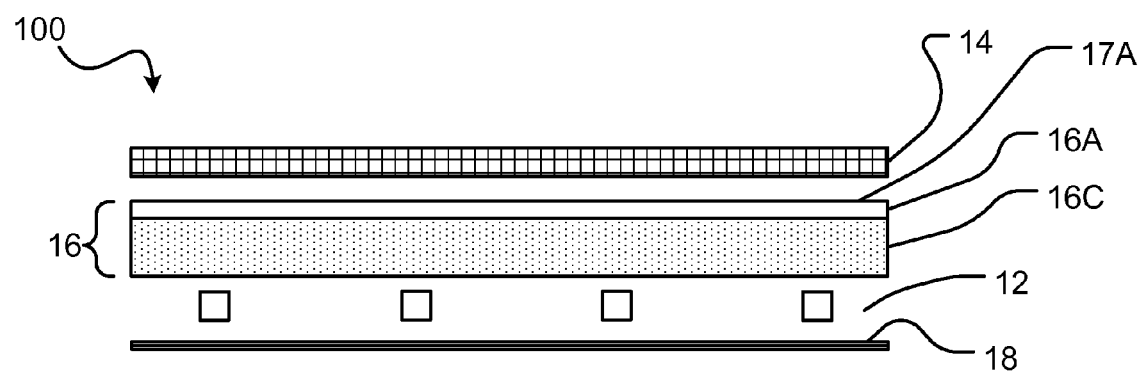
FIG. 10 is a schematic cross-section of a portion of a display according to an example embodiment.

FIG. 10 is a cross section through a display 100 in which light control layer 16 provides the additional function of serving as a brightness enhancement film. In display 100, light control layer 16 acts as a reflective polarizer for light. In the illustrated embodiment, light control layer comprises an ESR layer that is located near to the front side 17A of light control layer 16. This may be achieved, for example, by making layer 16A thin, not providing layer 16A or providing a second ESR layer on the front side of light control layer 16.

Figure 11:
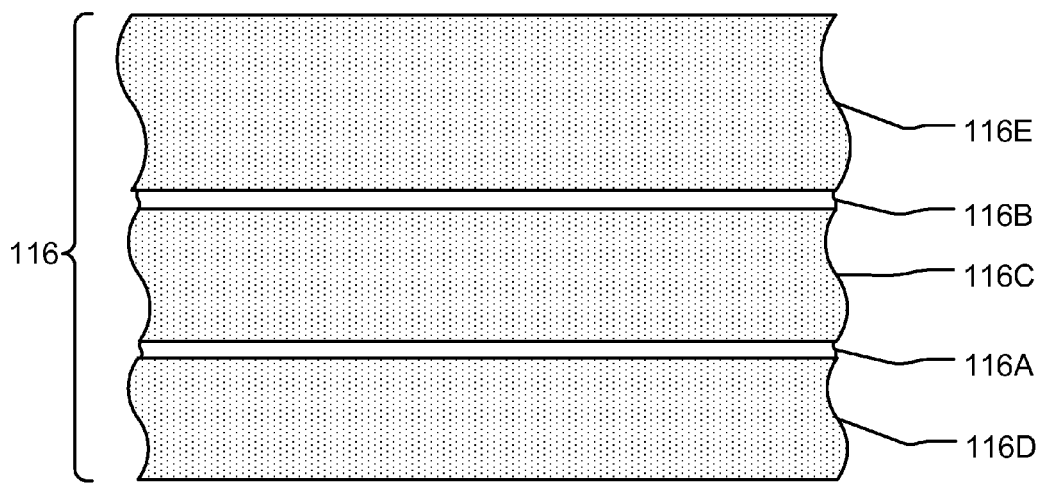
FIG. 11 is a schematic cross-section of a portion of a light control layer according to an example embodiment.

FIG. 11 shows a light control layer 116 according to an alternative embodiment which comprises two or more ESR layers. In the illustrated embodiment, adjacent ESR layers 116A and 116B are in optical contact with and spaced apart by a layer 116C of a material having an index of refraction that is a closer match to the material of the ESR layers than air. Additional layers 116D and 116E are provided. In some embodiments the material of one or more of layers 116C, 116D and 116E is a material that diffuses light (e.g. a material that includes a density of light scattering centers).

In displays according to some embodiments, light source layer 12 comprises light emitters that emit discrete colors of light. For example, light source 12 may emit red, blue and green light at discrete locations. In such embodiments, light control layer 16 may provide the additional function of mixing light of different colors before the light reaches light modulator 14. This can help to reduce or eliminate color fringing. Color fringing may occur, for example, where red, green and blue emitters are provided at locations that are spaced apart from one another in a single device that has a package that shadows light from the different emitters to different degrees in at least some directions.

Figure 12:
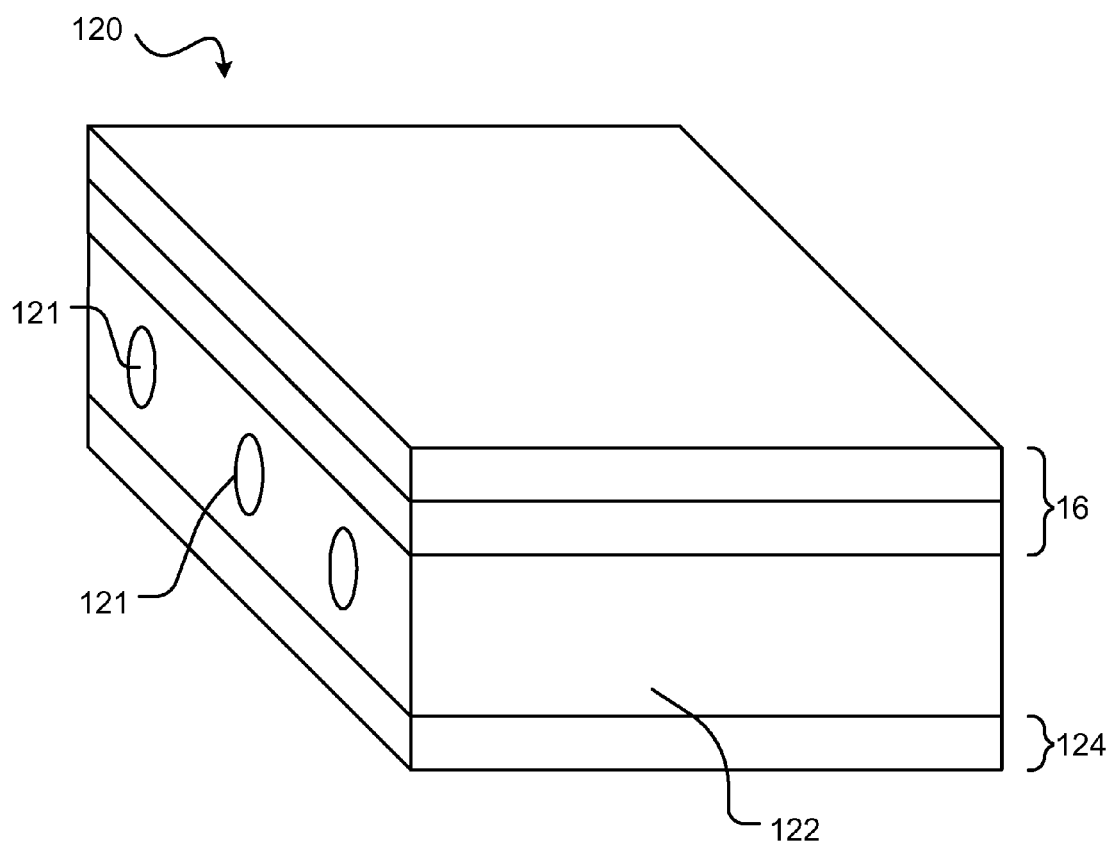
FIG. 12 is an isometric view of a light-emitting tile according to an example embodiment.

Light control layers as described herein may be incorporated in various display components. FIG. 12 shows, for example a light-emitting tile 120 that incorporates one or more light emitters 121 that emit light into a waveguide 122 having a front side faced with a light control layer 16 and a rear reflector 124.

Figure 13:
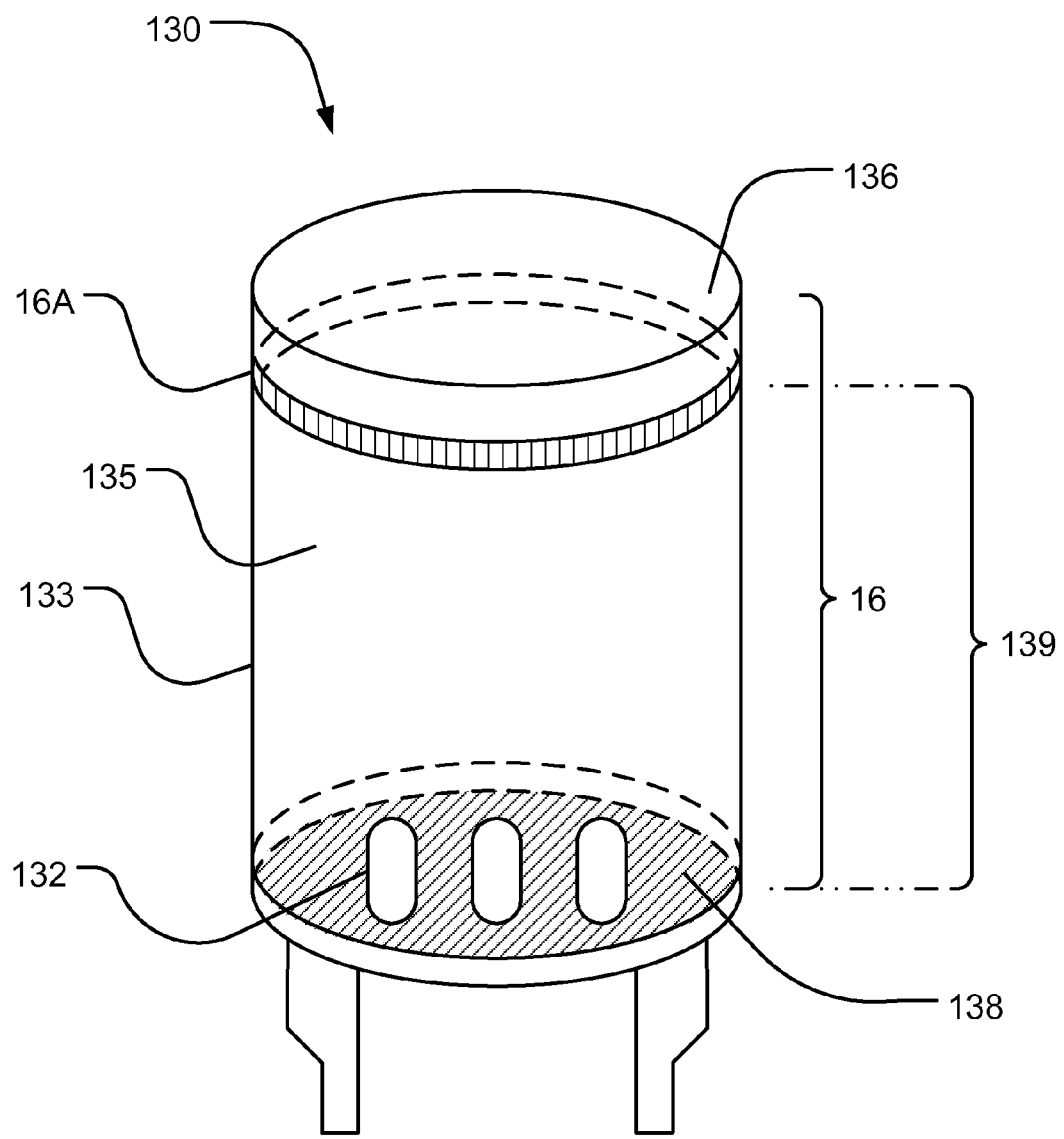
FIG. 13 is a schematic isometric view of a light-emitting diode according to an example embodiment.

FIG. 13 shows a light-emitting diode (LED) 130 comprising one or more light-emitting regions 132 in a package 133. Package 133 comprises a light control layer 16 formed by sandwiching an ESR film 16A between transparent material 135 of a lower part of the package and an additional layer 136. A back reflector 138 is provided in the package to define an optical cavity 139 within the package. In some embodiments, LED 130 may be a surface mount LED.

Figure 14:
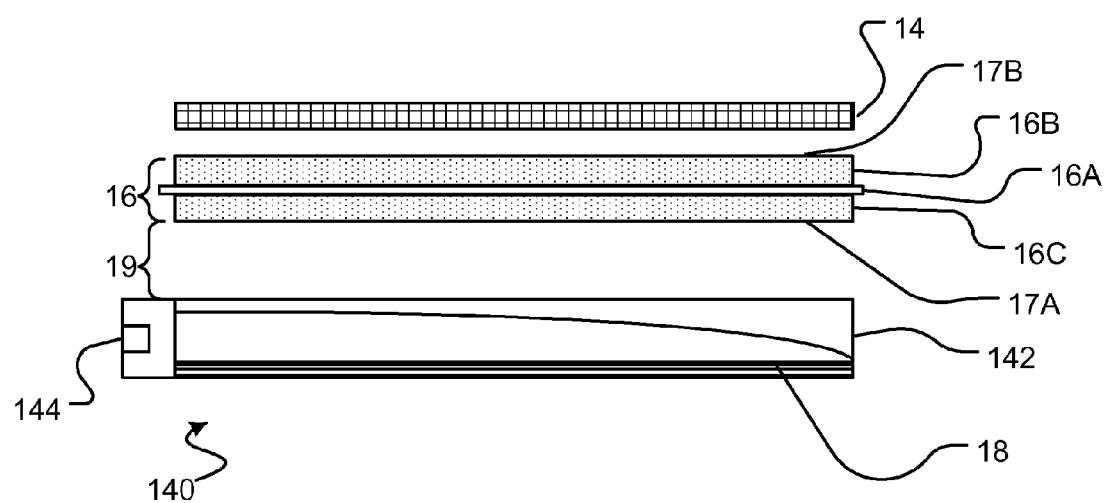
FIG. 14 is a schematic cross-section of a portion of a display 10 according to an example embodiment.

FIG. 14 shows an edge-lit display 140 which is similar to display 10 of FIG. 1 except that light source 12 comprises a waveguide 142 that is edge lit by light emitters 144.

In any embodiment as described herein it is desirable to avoid the case where too much of the light reflected back by light control layer 16 is absorbed by light emitters of light source 12. In some embodiments, this is achieved by providing light emitters (for example light-emitting diodes or other light-emitting semiconductors) that are physically small. This permits the coverage of reflector 18 to be maximized. Absorption of back-reflected light by light emitters of light source 12 may also be minimized by providing light emitters with highly reflective packages or embedding light emitters in reflector 18.

Some prototype light control layers 16 have been fabricated by casting layers of polyester resin on either side of a sheet of 3M Vikuiti™ ESR film. In these prototypes, the layers of polyester resin each had a thickness of either 2½ or 5 mm the 2½ mm thick layers were made from polyester resin mixed with one 0.04 mL drop of Castin' Craft™ white opaque pigment per 40 g of resin. The 5 mm thick layers were made from polyester resin mixed with either one 0.04 mL drop of Castin' Craft white opaque pigment or three 0.04 mL drops of Castin' Craft white opaque pigment per 40 g of resin. Peak luminance and total PSF energy were measured. Total PSF energy was measured by summing luminance values over an entire image. It was found that:

increasing the thickness of the front layer from 2½ to 5 mm tended to increase peak luminance (an average increase of approximately 13% was observed);

increasing the amount of pigment in the front layer from 1 to 3 drops tended to increase peak luminance (an average increase of 65% was observed);

increasing the rear layer thickness from 2½ mm to 5 mm tended to decrease peak luminance (an average decrease of approximately 8% was observed);

increasing the amount of pigment in the rear layer from 1 to 3 drops tended to increase peak luminance (an average increase of 42% was observed).

increasing the thickness of the front layer from 2½ to 5 mm tended to increase total PSF energy (an average increase of approximately 7% was observed);

increasing the amount of pigment in the front layer from 1 to 3 drops tended to increase total PSF energy (an average increase of 14% was observed);

increasing the rear layer thickness from 2½ mm to 5 mm tended to increase total PSF energy (an average decrease of approximately 10% was observed); increasing the amount of pigment in the rear layer from 1 to 3 drops tended to increase total PSF energy (an average increase of 10% was observed).

The relative amounts of energy in the central and tail portions of the point spread functions were measured for the prototype light control layers. It was found that the prototype made with 5 mm thick front and rear polyester layers each made with three 0.04 mL drops of pigment provided the lowest ratio of tail energy to central energy in the prototypes tested.

From the foregoing, it is apparent that inventive aspects as described herein may be embodied in things such as: displays, components for displays, optical stacks useful in displays, controllers for displays, methods for displaying images, and methods for making light control layers.

Where a component (e.g. a film, light source, controller, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

it is not mandatory that light reflector 18 comprise an ESR layer. In some embodiments, light reflector 18 comprises a diffuse reflector such as a layer of white paint or ink or a metallic reflector.

In some embodiments a holographic diffuser may be provided to assist in scattering and/or re-collimating light in a desired manner. For example, a holographic diffuser may be used to scatter light in a wider angular distribution after exiting light control layer 16 in the direction of light modulator 14, to account for angular transmission properties of light modulator 14, or to provide particular angular distribution characteristics for light exiting light modulator 14. The holographic diffuser may be integrated with light control layer 16 (as a separate layer, or in place of or integrated with layers 16B and/or 16C), provided between light control layer 16 and light modulator 14, or provided adjacent light modulator 14 and opposite light control layer 16.

In some embodiments, light source 12 may emit light in a number of relatively narrow wavelength ranges. In such embodiments, it is not mandatory that ESR layer 16A be highly reflective at wavelengths that are not emitted by light source 12. In such embodiments, ESR layer 16A may be constructed to be highly reflective to light in the specific wavelength ranges emitted by light source 12.

In some embodiments in which a plurality of ESR layers are provided, different ones of the ESR layers may be reflective in different wavelength ranges. For example, for a display in which light source 12 comprises emitters of red, green and blue light, two of the colors of light may each be reflected primarily by different ESR layers in a light control layer. As another example, a light control layer as described herein may have one ESR layer that is configured to reflect red light well (and may not reflect blue or green light as well), another ESR layer that is configured to reflect green light well (and may not reflect blue or red light as well), and another ESR layer that is configured to reflect blue light well (and may not reflect green or red light as well). In some such embodiments, ESR layers configured to reflect light from light emitters of a particular color may be adjacent to layers having patterns or surface features with spatial periodicity matching the spatial periodicity of the light emitters of the particular color.

In some embodiments, light control layer 16 has properties that are electronically controllable. For example, areas within layer 16B and/or 16C may comprise fluids containing scattering centers that can be caused to move by the application of electrical forces. As another example, optical contact between ESR layer 16A and one or both of layers 16B and 16C may be made to be switchable or variable in response to electrical control signals. Such control of the distribution of scattering centers in layers 16B and/or 16C may be applied to control the point spread function of light that passes through light control layer 16 and/or to provide enhanced local control of the light field at a light modulator 14.

As will be apparent from the foregoing description, the invention has many different aspects, some of which are set out below.

A. A display comprising:
   a light source,
   a spatial light modulator; and
   a light control layer in an optical path between the light source and the spatial light modulator, the light control layer comprising:
      an enhanced specular reflector layer, and
      a first optical layer in optical contact with a first side of the enhanced specular reflector layer, the first optical layer at least one of substantially transparent and substantially translucent.

B. A backlight assembly comprising:
   a light control layer; and
   a light source configured to emit light toward the light control layer,
   the light control layer comprising:
      an enhanced specular reflector layer, and
      a first optical layer in optical contact with a first side of the enhanced specular reflector layer, the first optical layer at least one of substantially transparent and substantially translucent.

C. A light emitter comprising:
   a light emitting region; and
   a package,
   the package comprising a back reflector and a light control layer mounted on the back reflector and enclosing the light emitting regions therebetween.

C. A light control layer comprising:
   an enhanced specular reflector layer, and
   a first optical layer in optical contact with a first side of the enhanced specular reflector layer, the first optical layer at least one of substantially transparent and substantially translucent.

E. A control system for a display comprising a light source configured to emit light through a light control layer onto a light modulator, the control system comprising:
   a light source controller configured to generate control signals for controlling the light source;
   a light field simulator configured to generate a light field simulation of the light field produced at the light modulator by light emitted from the light source in response to the light source control signals and passing through the light control layer; and a light modulator controller configured to generate light modulator control signals for controlling the light modulator based at least in part on the light field simulation.

F. A method for controlling a display comprising a light source configured to emit light through a light control layer onto a light modulator, the method comprising:
- generating light source control signals for controlling the light source;
- generating a light field simulation of the light field produced at the light modulator by light emitted from the light source in response to the light source control signals and passing through the light control layer; and
- generating light modulator control signals for controlling the light modulator based at least in part on the light field simulation.

Embodiments according to the foregoing exemplary aspects, as well as embodiments according to other aspects, may optionally include or be characterised by one or more of the following features:

The first optical layer is in optical contact with a side of specular reflector layer that faces the light source The first optical layer is in optical contact with a side of specular reflector layer that faces away from the light source The first optical layer is in optical contact with a side of specular reflector layer that faces the spatial light modulator The first optical layer comprises a dielectric material, such as:
- TiO2
- SiO2
- Tellurium
- Polymers The first optical layer comprises plastic, such as:
- polycarbonate
- poly(methyl methacrylate)
- acrylic
- polyester resin
- polyurethane
- birefringent polyester
- isotropic polyester
- syndiotactic polystyrene The first optical layer comprises glass The first optical layer having thickness>500 μm The first optical layer is thicker than the enhanced specular reflector layer The enhanced specular reflector layer is disposed on side of light source that is opposite the side of the light source facing the light control layer
- The enhanced specular reflector layer comprises ESR film
- The enhanced specular reflector layer comprises a diffuse reflector
  - The diffuse reflector comprises white paint
  - The diffuse reflector comprises white ink The light control layer reflects in the range of 65% to 85% of light incident on it The light control layer reflects approximately 73%±5% of the light incident on it The light control layer specularly reflects in the range of 5% to 20% of light incident on it The first layer has a thickness of 2.5 mm
- first layer made from polyester resin mixed with 1 drop pigment per 40 g of resin First layer having a thickness of 5 mm
- first layer made from polyester resin mixed with 1 drop pigment per 40 g of resin first layer made from polyester resin mixed with 3 drops pigment per 40 g of resin The light control layer comprises a second optical layer in optical contact with a second side of the enhanced specular reflector layer opposite the first side
- The first and second optical layers comprise a same material
- The first and second optical layers comprise different materials
- The first and second optical layers have substantially the same index of refraction
- The first and second optical layers have different indices of refraction
- The first and second layers each have a thickness of 5 mm and are made from polyester resin mixed with 3 drops of pigment per 40 g of resin The enhanced specular reflector layer has a reflectivity of less than 96% for light entering the layer from air The light control layer comprises a plurality of enhanced specular reflector layers
- The light control layer comprises two enhanced specular reflector layers in optical contact with and spaced apart by an optical layer having an index of refraction closer to the indices of refraction of the enhanced specular reflector layers than the index of refraction of air The first optical layer comprises scattering centers
- The scattering centers comprise pigment
  - The pigment comprises $TiO_2$
- The scattering centers comprise refractive light scatters
  - The scattering centers comprise glass beads
    - The glass beads comprise high refractive index glass
  - The refractive light scatters have an index of refraction greater than 1.6
- The scattering centers comprise discontinuities in the first optical layer
  - The scattering centers comprise air bubbles
  - The scattering centers comprise dislocations
- The scattering centers comprise lambertian scattering centers
- The scattering center comprise anisotropic scatterers
- The scattering centers are distributed in the bulk of the first optical layer
  - The scattering centers are distributed substantially uniformly in the bulk of the first optical layer
  - The scattering centers are distributed non-uniformly in the bulk of the first optical layer The first optical layer is configured such that light control layer increases the ratio of the amount of light energy in a central portion of the point spread function to an amount of light energy in tails of the point spread function by a factor A as follows:

$$A = \frac{(E_{CF}/E_{TF})}{(E_{CW}/E_{TW})}$$

where:
- $E_{CF}$ is the optical energy within one full-width at half maximum of the point spread function in the presence of the light control layer;
- $E_{TF}$ is the optical energy outside of twice the full width at half-maximum of the point spread function in the presence of the light control layer;

$E_{CW}$ is the optical energy within one full-width at half maximum of the point spread function in the absence of the light control layer; and $E_{TW}$ is the optical energy outside of twice the full width at half-maximum of the point spread function in the absence of the light control layer.

A is in the range of 0.7-1.8

The light source comprises a plurality of light emitters

The light emitters are individually-controllable

The light emitters disposed in a spatially periodic arrangement and light control layer comprises an arrangement of features having the same spatial periodicity as the periodicity of the arrangement of light emitters The light control layer comprises a physical feature that is symmetric about the optical axis of at least one of the plurality of light emitters The physical feature comprises a density gradient of scattering centers in the first optical layer The physical feature comprises a density gradient of scattering centers on a surface of the first optical layer The density gradient of scattering centers increases in directions away from the optical axis of the at least one light emitter The density gradient comprises a first density sub-gradient of scattering centers in an inner region extending radially outwardly from the optical axis of the at least one light emitter and a second density sub-gradient of scattering centers in an outer annular region adjacent the inner region, the first density higher than the second density The first and second density sub-gradients are discontinuous The physical feature comprises a density gradient of scattering centers on a surface of the first optical layer The physical feature is circularly symmetric about the optical axis of the at least one scattering center The light source comprises light emitters of different types The light source comprises light emitters of different colors The density of scattering centers varies differently in the vicinity of light emitters of different types The density of scattering centers varies differently in the vicinity of light emitters of different colors The light emitters comprise light emitting regions and a package, the package comprising a back reflector; and a light control layer mounted on the back reflector and enclosing the light emitting regions The light control layer comprises a first transparent optical layer mounted on the back reflector;

an enhanced specularly reflecting film in optical contact with the first transparent layer The light control layer comprises a second transparent optical layer in optical contact with the enhanced specularly reflecting film A first surface of the first optical layer comprises a spatially varying surface feature The surface feature comprises dimples The surface feature comprises frosting The surface feature comprises prism-shaped indentations The surface feature comprises deposits of light scattering material The surface feature comprises surface-relief holographic diffuser elements The first surface of the first optical layer is adjacent the enhanced specular reflector layer The first surface of the first optical layer opposite the enhanced specular reflector layer The display comprises a diffuser The display comprises a dual brightness enhancing film A distance between the reflector and a front surface of the light modulator is less than 1.25 cm A distance between the reflector and a front surface of the light modulator is less than 0.625 cm A thickness of the optical layer proximate the reflector makes up 60% of the thickness of an optical cavity defined between the reflector and the surface of optical layer in contact with the side of the enhanced specular reflector layer that is not in contact with the enhanced specular reflector layer A thickness of the optical layer proximate the reflector makes up 80% of the thickness of an optical cavity defined between the reflector and the surface of optical layer in contact with the side of the enhanced specular reflector layer that is not in contact with the enhanced specular reflector layer The light control layer is configured to concentrate light emitted by individual light emitters within corresponding areas of the light modulator, the corresponding areas having a diameter substantially equal to six times a distance between the light source and the light modulator more than 50% of the light emitted by the light emitters that reaches the light modulator is concentrated within the corresponding areas more than 55% of the light emitted by the light emitters that reaches the light modulator is concentrated within the corresponding areas The light emitters are spaced apart from their closest neighbour by distances that are within 10% of the radius of the corresponding area The light emitters are in optical contact with the light control layer The light emitters project outwardly from the back reflector, and the light control layer is spaced apart from the back reflector by the light emitters The light emitters are optically coupled to the light control layer The light emitters are embedded in the back reflector While a number of exemplary aspects and embodiments have been discussed above, those of skill in the art will recognize certain modifications, permutations, additions and sub-combinations thereof. Features of the embodiments described herein may be combined with features of other embodiments to yield further embodiments. It is therefore intended that the following appended claims and claims hereafter introduced are interpreted to include all such modifications, permutations, additions and sub-combinations as are within their true spirit and scope.

What is claimed is:

1. A display comprising:
a light source,
a spatial light modulator; and
a light control layer in an optical path between the light source and the spatial light modulator, the light control layer comprising:
an enhanced specular reflector layer, and a first optical layer in optical contact with a first side of the enhanced specular reflector layer, the first optical layer at least one of substantially transparent and substantially translucent, wherein an optical transmission coefficient for the light control layer is greater than an optical transmission coefficient for the enhanced specular reflector layer on its own; and wherein the first optical layer is configured such that light control layer increases the ratio of the amount of light energy in a central portion of the point spread function to an amount of light energy in tails of the point spread function by a factor A as follows:

$$A = \frac{(E_{CF}/E_{TF})}{(E_{CW}/E_{TW})}$$

where:
$E_{CF}$ is the optical energy within one full-width at half maximum of the point spread function in the presence of the light control layer;
$E_{TF}$ is the optical energy outside of twice the full width at half-maximum of the point spread function in the presence of the light control layer;
$E_{CW}$ is the optical energy within one full-width at half maximum of the point spread function in the absence of the light control layer; and
$E_{TW}$ is the optical energy outside of twice the full width at half-maximum of the point spread function in the absence of the light control layer.

2. A display according to claim 1, wherein a first surface of the first optical layer comprises a spatially varying surface feature, the surface feature comprising dimples or frosting or prism-shaped indentations or deposits of light scattering material or surface-relief holographic diffuser elements.

3. A display according to claim 1, wherein the light source comprises a plurality of light emitters.

4. A display according to claim 3, wherein the light emitters are disposed in a spatially periodic arrangement, and light control layer comprises an arrangement of features having the same spatial periodicity as the periodicity of the arrangement of light emitters.

5. A display according to claim 3, wherein the light control layer comprises a physical feature that is symmetric about the optical axis of at least one of the plurality of light emitters, the physical feature comprising a density gradient of scattering centers in the first optical layer.

6. A display according to claim 3, wherein the light source comprises a waveguide that is edge-lit by the plurality of light emitters.

7. A display according to claim 3, wherein the light control layer is configured to concentrate light emitted by individual light emitters within corresponding areas of the light modulator, the corresponding areas having a diameter substantially equal to six times a distance between the light source and the light modulator.

8. A display according to claim 7, wherein the first optical layer comprises a rear layer located between the enhanced specular reflector layer and a back reflector, an optical cavity is defined between the back reflector and the enhanced specular reflector layer and the rear layer occupies at least ¾ of a thickness of the optical cavity.

* * * * *